(12) United States Patent
Hing et al.

(10) Patent No.: US 7,646,934 B2
(45) Date of Patent: Jan. 12, 2010

(54) METHOD AND APPARATUS FOR DETECTING AN IMAGE OF A REFLECTIVE OBJECT

(75) Inventors: Cheung Chuen Hing, Kowloon (HK); Hiromu Ueshima, Kusatsu (JP); Shuhei Kato, Kusatsu (JP)

(73) Assignee: SSD Company Limited, Shiga (JP)

(*) Notice: Subject to any disclaimer, the term of this patent is extended or adjusted under 35 U.S.C. 154(b) by 711 days.

(21) Appl. No.: 11/138,410

(22) Filed: May 27, 2005

(65) Prior Publication Data
US 2006/0140485 A1 Jun. 29, 2006

Related U.S. Application Data

(63) Continuation-in-part of application No. 11/022,774, filed on Dec. 28, 2004.

(51) Int. Cl.
G06K 9/00 (2006.01)
G06K 9/68 (2006.01)
(52) U.S. Cl. .................. 382/291; 382/103; 382/219
(58) Field of Classification Search ........... 382/103, 382/219, 291
See application file for complete search history.

(56) References Cited

U.S. PATENT DOCUMENTS

| | | | | |
|---|---|---|---|---|
| 4,802,229 A | * | 1/1989 | Yamada | 382/289 |
| 5,056,791 A | * | 10/1991 | Poillon et al. | 473/156 |
| 5,988,504 A | * | 11/1999 | Smitt | 382/237 |
| 6,064,758 A | * | 5/2000 | Jin | 382/151 |
| 6,144,366 A | * | 11/2000 | Numazaki et al. | 345/156 |
| 6,201,892 B1 | * | 3/2001 | Ludlow et al. | 382/149 |
| 6,226,406 B1 | * | 5/2001 | Hsieh | 382/209 |

(Continued)

FOREIGN PATENT DOCUMENTS

JP 6-223184 8/1994

(Continued)

OTHER PUBLICATIONS

Lee, K.; Kenton Lee: X Window System Technical Glossary [online], 1996 [retrieved on Apr. 9, 2009]. Retrieved from the Internet <URL: http://www.rahul.net/kenton/xglossary.html>.*

(Continued)

*Primary Examiner*—Charles Kim
*Assistant Examiner*—Stephen R Koziol
(74) *Attorney, Agent, or Firm*—Harness, Dickey & Pierce, P.L.C.

(57) ABSTRACT

A method of detecting an image of a reflective object includes the steps of capturing an exposure image by an image sensor while an LED is ON; down-sampling an exposure image signal from the image sensor to a first digital signal by comparing the level of the first image signal with a first reference level; capturing a dark image by the image sensor while the LED is OFF; down-sampling a second image signal from the image sensor to a second digital signal by comparing the level of the second image signal with a second reference level; computing an image of difference between the exposure image and the dark image by subtracting the second digital signal from the first digital signal; and specifying the image of the reflective object by locating a bright point remaining in the image of difference.

10 Claims, 29 Drawing Sheets

U.S. PATENT DOCUMENTS

| | | | |
|---|---|---|---|
| 6,377,703 B1 * | 4/2002 | Yeung | 382/173 |
| 7,068,855 B2 * | 6/2006 | Simske et al. | 382/289 |
| 2002/0098897 A1 * | 7/2002 | Manwaring | 473/151 |
| 2003/0231803 A1 * | 12/2003 | Huang | 382/282 |
| 2004/0240754 A1 * | 12/2004 | Smith et al. | 382/286 |
| 2005/0239548 A1 | 10/2005 | Ueshima et al. | |
| 2006/0204056 A1 * | 9/2006 | Steinberg et al. | 382/118 |

FOREIGN PATENT DOCUMENTS

| | | |
|---|---|---|
| JP | 2004-085524 A | 3/2004 |
| WO | WO 2004/002593 A1 | 1/2004 |

OTHER PUBLICATIONS

Midpoint [online], [retrieved on Feb. 13, 2009]. Retrieved from the Internet <URL: http://www.coedu.usf.edu/main/departments/sped/PROPEL/documents/MicrosoftWord-Midpoint.pdf>.*

International Search Report and Written Opinion dated May 16, 2006.

Midpoint [online], [retrieved on Feb. 13, 2009]. Retrieved from the Internet <URL: http//www.coedu.usf.edu/main/departments/sped/PROPEL/documents/MicrosoftWord-Midpoint.pdf>, 2009.

* cited by examiner

Fig. 30

| IR-CTL | FS | TR1 | VA | TR2 | VB | TR3 | VC | RC |
|---|---|---|---|---|---|---|---|---|
| H | L | ON | H | ON | L | ON | =<0.6V | 5.6K |
| H | H | OFF | H | ON | L | ON | =<0.6V | 5.6K |
| L | L | ON | L | OFF | H | OFF | HIGH-IMPEDANCE | 8.2K |
| L | H | OFF | L | OFF | H | OFF | HIGH-IMPEDANCE | 8.2K |

METHOD AND APPARATUS FOR DETECTING AN IMAGE OF A REFLECTIVE OBJECT

The present invention is a continuation-in-part of the following prior application by the present applicant:

(1) an application titled "Method of Detecting Position of Rectangular Object and Object Detector" (Ser. No. 11/022,774, filed Dec. 28, 2004).

The above materials are expressly incorporated by reference herein.

BACKGROUND OF THE INVENTION

1. Field of the Invention

The present invention generally relates to a method and an apparatus for detecting a position of an object and its angle to a specific reference and, more particularly, it relates to a method and an apparatus that precisely detects a position and its angle of a tool used in computer games.

2. Description of the Background Art

Sports computer games directed to baseball, football, golf, tennis, table tennis, bowling, and so on form one of the categories of computer games. Most of these sports games require associated tools for playing. A bat for baseball, a racket for tennis or table tennis, a bowling ball for bowling, to name a few. A game program running on a CPU (Central Processing Unit) of a game apparatus creates a virtual game situation where a user is supposed to be a player, generates a video image of surroundings, and shows the image on a television set (TV). When a specific situation arises, the player is requested to take an action using the tool. In response to the player's action, the game program changes the virtual situation, and the player is requested to take a next action.

Take a golf game as an example. At the start of the game, a golf game program creates a scene of a teeing ground. A green can be seen on a backside of the teeing ground and a virtual golf ball is placed at the center (or any other place) of the teeing ground. Then, the player "addresses" an image sensor unit placed on a floor and tries to hit the virtual ball with a club, i.e., swings the club above the image sensor unit.

When the player swings the club, the image sensor picks up an image of the moving club head. The image of the club head is applied to the golf game program. In response, the golf game program computes the position of the club head on the basis of the image, computes the direction and the speed of the club head on the basis of the position, computes the resultant trajectory of the imaginary golf ball hit by the imaginary golf club in accordance with the direction and the speed of the club head, and creates a new game situation in accordance with the new position of the golf ball.

Naturally, specific hardware is necessary for detecting the position of the club head. Japanese Patent Application Laying-Open (Tokkai) No. 2004-85524 discloses an apparatus for detecting such positions of a game tool. The apparatus is used in a computer golf game and includes a stroboscope having four LED's (light emitting diodes), a CMOS (Complementary Metal-Oxide-Silicon) image sensor (hereinafter "CIS"), and a processor. A reflector is attached to the bottom (sole) of a club head or a putter head. The reflector has a long rectangular shape with circular ends. The apparatus is connected to a TV monitor and a golf game program running on the processor generates the video image of a virtual golf course in response to player's action with the club or the putter.

In operation, the CIS captures two kinds of images: images during the stroboscope LED's are on (emitting light); and images during the stroboscope LED's are off. The image signals are applied to the processor, where necessary computation is carried out.

When LED's are emitting light, the reflector reflects that light to the CIS; therefore, the CMOS sensor forms the image of the reflector. Other light sources also form images on the CIS. When the LED's are off, the reflector does not reflect the light; the image is not formed. Only other light sources form their images. By computing the difference between these two kinds of images in the processor, therefore, the processor can detect the image of the reflector separate from other images.

The processor detects two points farthest from each other in the image of the reflector. These two points indicate the two ends of the mid line of the reflector; by knowing the X and Y coordinates of these points, the processor can know the position of the club head or the putter head as an average of these two points. By computing the average of these two points for each of the captured images, the processor computes the direction and the speed of the movement of the club head. Also, the processor can compute the angle $\theta$ between the line connecting the two end points of the reflector and a prescribed reference line. From this angle $\theta$, the angle of the clubface can be computed.

The golf game program running on the processor processes these data, determines the trajectory of the virtual golf ball, and creates next virtual situation.

However, in order to determine the two farthest points in the image of the reflector, the processor have to compute the distance of each combination of two points in the image of the reflector. This is relatively complicated operation and requires a considerable amount of computing time. Further, the CIS has a 32×32 pixel, 8 bits per pixel image plane. The data size of one image therefore amounts to 8192 bits=1024 bytes. The processor needs to receive the data from the CIS, store the data, and carry out the above-described computations on the stored data.

Therefore, a processor with relatively high performance is necessary in order to carry out the computations necessary for the game in real time. Also, the processor needs to have storage with a capacity large enough to store the data output from the CIS. This results in a computer game machine with a relatively high cost. Because younger people are the main users of the computer game machines, the game machines should be inexpensive although they should have enough performance to fully operate in real time.

Further, because it is basic demands that the game machine responses to the operation of the user, the image of the reflector should be precisely detected.

SUMMARY OF THE INVENTION

Therefore, one of the objects of the present invention is to provide a method and an apparatus for detecting an image of a reflective object that detect a position of the reflective object with a simple operation.

Another object of the present invention is to provide a method and an apparatus for detecting an image of a reflective object that detect a position of the reflective object with smaller amount of computation compared with the prior art.

Still another object of the present invention is to provide a method and an apparatus for detecting an image of a reflective object that precisely detect a position of the reflective object with a simple operation.

Yet another object of the present invention is to provide a method and an apparatus for detecting an image of a reflective object having simple structure that detect a position of the reflective object with smaller amount of computation compared with the prior art.

In accordance with the first aspect of the present invention, a method of detecting an image of a reflective object comprising the steps of capturing a first image by an image sensor while a light-emitting device is emitting light; down-sampling a first image signal outputted from the image sensor to a first digital signal by comparing the level of the first image signal with a predetermined first reference level; capturing a second image by an image sensor while the light-emitting device is not emitting light; down-sampling a second image signal outputted from the image sensor to a second digital signal by comparing the level of the second image signal with a predetermined second reference level; computing an image of difference between the first image and the second image by subtracting the second digital signal from the first digital signal; and specifying the image of the reflective object by locating a bright point remaining in the image of difference.

The first and second images are down-sampled and the difference image is computed based on these images. Because the image data is in a digital format, the computation is simple and a relatively low-performance CPU or MCU can carry out the calculation within a period short enough to immediately respond to the movement of the reflective object.

Preferably, the first reference level is the same as the second reference level. The step of down-sampling a first image signal includes the steps of lowering the level of the first image by a predetermined amount; and down-sampling the first image signal having its level lowered by comparing the level of the first image signal having its level lowered with the second reference level.

Alternatively, the first reference level is selected to be higher than the second reference level by a predetermined amount.

Further preferably, the light emitting device includes a light emitting diode that emits light of a non-visible, for instance infrared, wavelength and the step of capturing a first image includes the step of capturing the first image by an image sensor with a filter that substantially blocks visible light while the light emitting device is emitting light, and the step of capturing a second image includes the step of capturing the second image by the image sensor with the filter while the light emitting device is not emitting light.

The step of computing may include the step of computing the image of difference between the first image and the second image by subtracting the second digital signal from the first digital signal on a pixel-to-pixel basis.

In accordance with the second aspect of the present invention, an apparatus for detecting an image of a reflective object comprising: a light-emitting device; an image sensor; a control device that causes the light emitting device and the image sensor such that the image sensor captures two successive images including a first image and a second image; the first image being captured while the light emitting device is emitting light, the second image being captured while the light emitting device is not emitting light; a down-sampling circuit connected to receive the output of the image sensor, for down-sampling the image signals of the first image and the second image outputted from the image sensor; a difference image computing unit for computing a difference image by subtracting the down-sampled image signal of the second image from the down-sampled image signal of the first image; and a means for specifying the image of the reflective object in the difference image by locating a bright point in the difference image.

The device may further includes a light control circuit that outputs a light control signal that assumes a predetermined first level or a predetermined second level, indicating a period when the light emitting device is allowed to emit light and a period when the light emitting device is prohibited from emit light, respectively. The down-sampling circuit includes: a potential divider adjuster connected to receive the output of the image sensor, for lowering the level of the output of the image sensor by a predetermined amount while the light control signal is at the first level and for raising the level of the output of the image sensor by the predetermined amount while the light control signal is at the second level.

Preferably, the potential divider adjuster includes: a first and second resistors connected in series between an output terminal of the image sensor and a ground potential thereby forming a potential divider, a third resistor having one end connected to a connecting node of the first and second resistors, a switching device connected between the other end of the third resistor and the ground potential for controlling the connection of the other end of the third resistor and the ground potential in response to the light control signal.

In accordance with the third aspect of the present invention, a computer game program product includes: a computer readable recording medium storing a computer executable game program thereon. The game program includes: a first computer readable program code means for causing the computer to generate an image of imaginary object to be moved by the user in the game and a direction indicator indicating a desired direction in which the imaginary object is to be moved by the user in the game; a second computer readable program code means for causing the computer to receive a time-series data including position data of a controller of the game, the position data indicating a position of a representative point of the controller at a certain time with reference to a predetermined coordinate system; a third computer readable program code means for causing the computer to compute a trajectory of the imaginary object in response to the received time-series of position data, wherein the trajectory is computed such that a direction of movement of the imaginary object is determined using the desired direction as a reference based on the position data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 30 is a table showing the operation of potential divider adjuster 730;

DESCRIPTION OF THE PREFERRED EMBODIMENTS

First Embodiment

-Overall Arrangement of the System-

Figure 1:
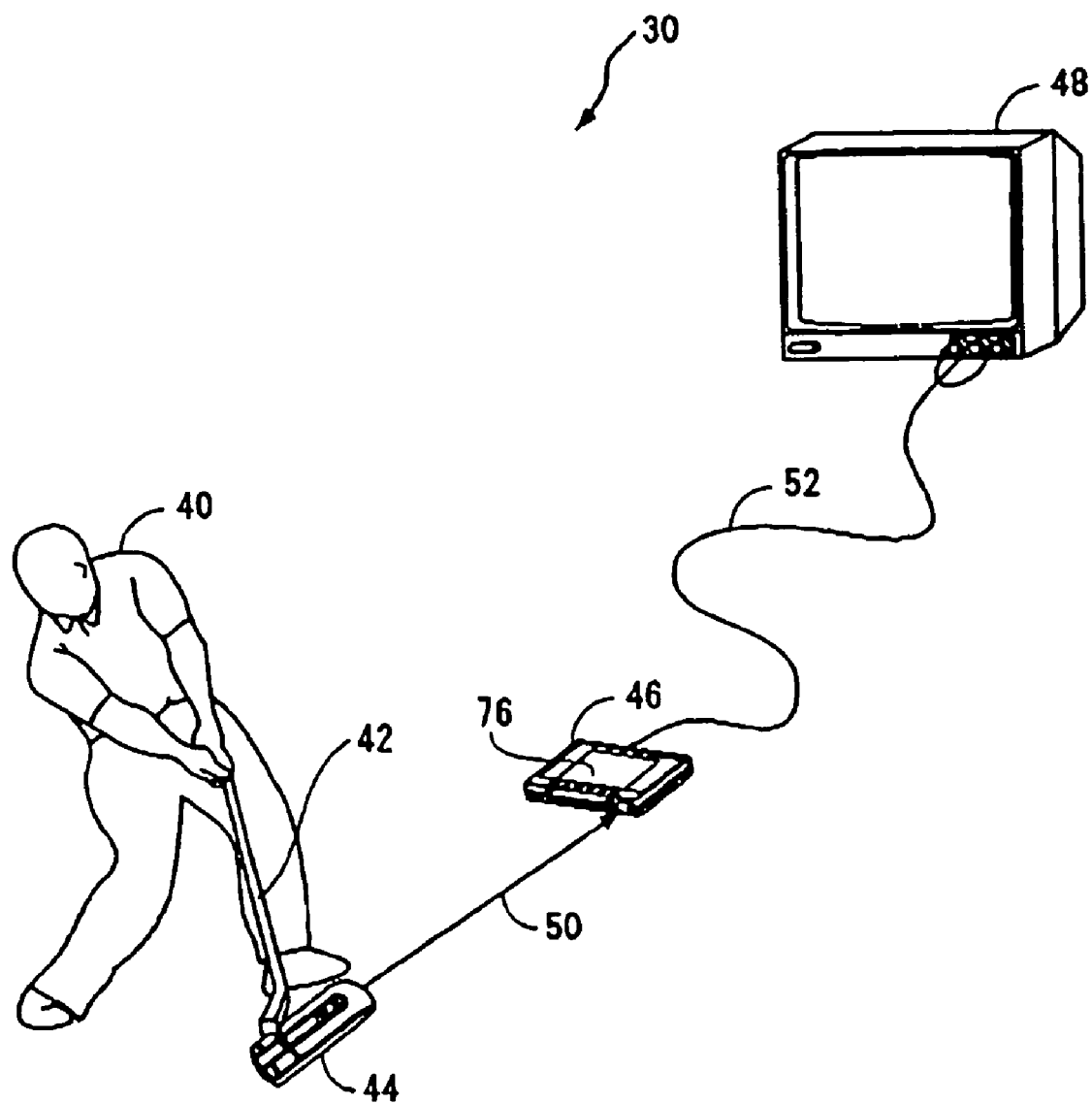
FIG. 1 illustrates an overall arrangement of a golf game system 30 in accordance with a first embodiment of the present invention.

FIG. 1 shows an overall arrangement of a golf game system 30 in accordance with one embodiment of the present invention. Referring to FIG. 1, golf game system 30 includes: an adaptor 46 having connection facility to TV 48 via a cable 52 and a wireless IR (Infrared) communication capability; and a game cassette 76 that is to be mounted on adaptor 46.

Figure 2:
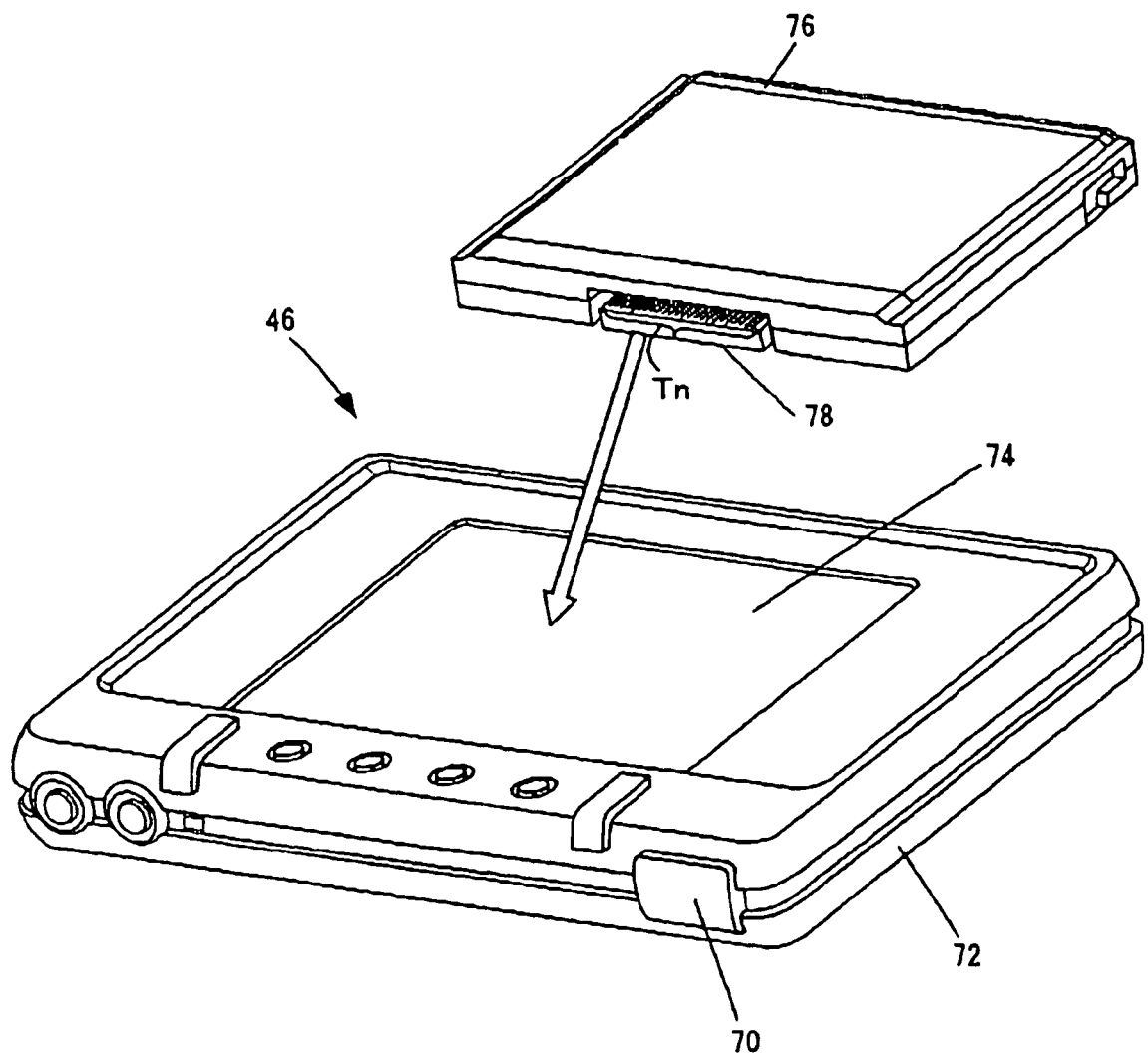
FIG. 2 shows a game cassette 76 including a CPU and a memory that stores a golf game program, and an adaptor 46 for the game cassette 76 having TV connection capabilities and IR communication capability.

Referring to FIG. 2, adaptor 46 has a housing 72 and a receiving stage 74 that moves up and down within housing 72. A connector (not shown) is provided within housing 72 of adaptor 46 and by pushing down receiving stage 74, the connector is exposed. Adaptor 46 further has an IR receiving window 70 for IR communication.

Game cassette 76 has a connector 78 with connector pins Tn. When game cassette 76 is put on receiving stage 74, pushed down and slid toward the front face of adapter 46, connector 78 will be coupled with the connector of adaptor 46. Although not illustrated, game cassette 76 includes a processor and a memory that stores a golf game program. The processor of game cassette 76 can utilize the IR communication capability of adaptor 46. The processor can also apply a video image signal of a golf game to TV 48 shown in FIG. 1.

Referring again to FIG. 1, golf game system 30 further includes: a golf club-type controller 42 which a player 40 uses to play the golf game; and a swing detector 44 for detecting the position of the head of controller 42 as well as the angle of the clubface of controller 42 with reference to a predefined reference direction. Swing detector 44 also has a wireless IR communication capability and can transmit the detected position of the head of controller 42 as well as the angle of the clubface to adaptor 46 through IR light 50.

-Overview of Swing Detector 44-

Figure 3:
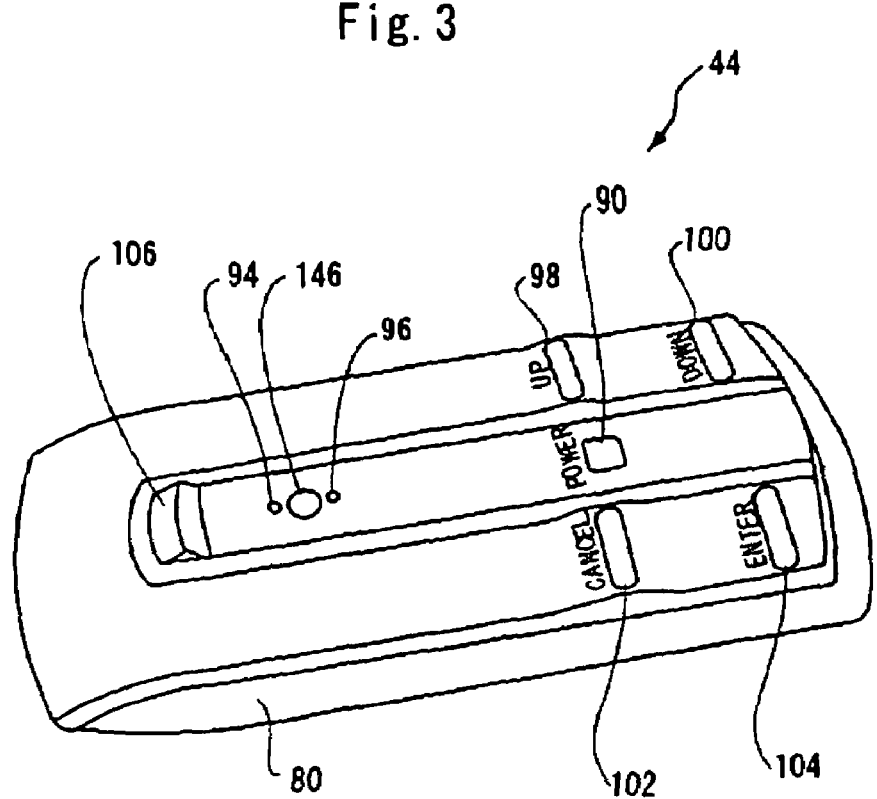
FIG. 3 is a perspective view of a swing detector 44 for detecting the direction and the speed of a club head as well as an angle of its face in accordance with the embodiment.

Referring to FIG. 3, swing detector 44 includes a relatively flat housing 80. Swing detector 44 further includes: an IR LED 106 for transmitting data; a power switch 90; four buttons 98, 100, 102, and 104 for adjusting functions of swing detector 44; a CIS 146; and two IR LED's 94 and 96 for exposure provided on either side of CIS 146, all arranged on the upper surface of housing 80. The arrangement of the circuitry within swing detector 44 will be described later with reference to FIG. 5.

Figure 4:
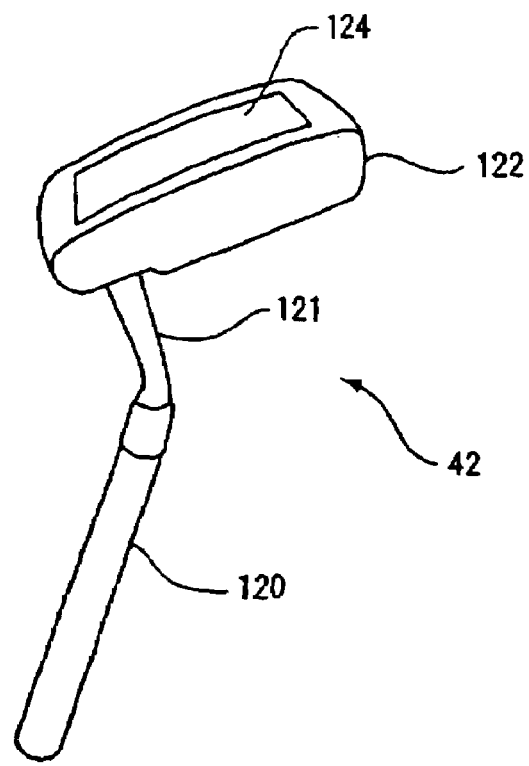
FIG. 4 shows a controller 42 for a golf game used with the swing detector 44 shown in FIG. 3.

Referring to FIG. 4, controller 42 includes a shaft 120; and a club head 122 with a neck 121 that is connected to shaft 120. On the bottom (sole) of club head 122, a reflector strip 124 having a rectangular shape is attached. Retro-reflector strip 124 has two sets of edges; longer ones and shorter ones. Retro-reflector strip 124 is attached to club head 122 so that its longer edges are parallel to the edge of the clubface.

-Internal Structure of Swing Detector 44-

Figure 5:
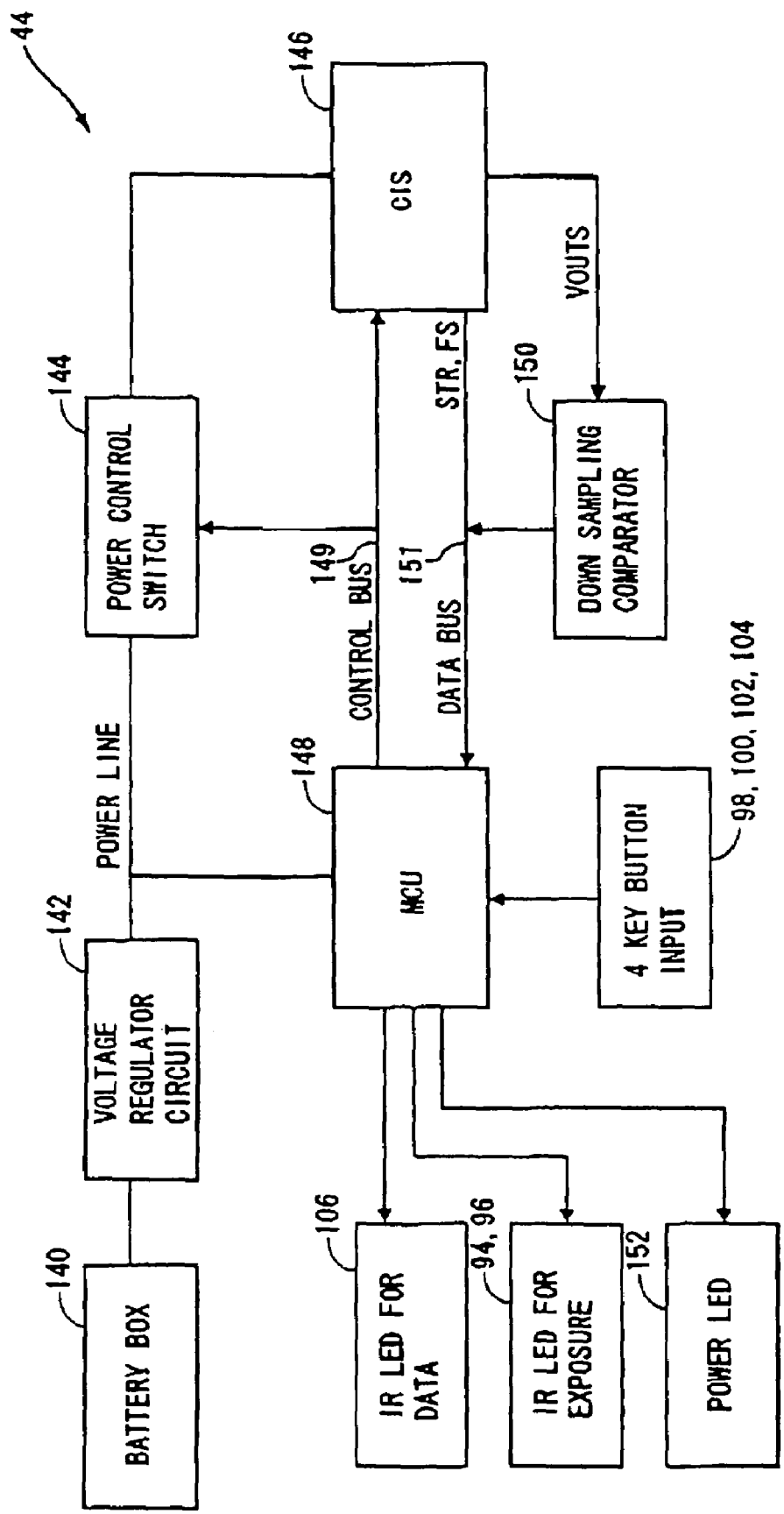
FIG. 5 shows a functional block diagram of the swing detector 44 in accordance with the first embodiment.

Referring to FIG. 5, in addition to IR LED 106, IR LED's 94 and 96 and four buttons 98, 100, 102 and 104, swing detector 44 includes as its inner circuitry: CIS 146 having 32H (Horizontal)×32V (Vertical) resolution and outputting VOUTS signal, which includes a series of analog pixel values; a down sampling comparator 150 connected to receive the VOUTS signal from CIS 146 for down-sampling the VOUTS signal to a 1-bit binary signal; an MCU (Micro Controller Unit) 148 that receives the output of down sampling comparator 150 for computing the position of the center point of the club head as well as the angle of the clubface; and a power LED 152 embedded within power key 90 shown in FIG. 3 for the indication of power on and off. Although not shown, MCU 148 has an internal memory, registers, and a CPU.

Down sampling comparator 150 includes a Schmidt trigger. In this embodiment, the positive going threshold and the negative going threshold of Schmidt trigger is the same $V_{TH}$. When the level of the input analog signal goes higher than the threshold $V_{TH}$, the output of down sampling comparator 150 immediately goes High. If the level of the input analog signal falls to a level lower than the threshold $V_{TH}$, the output of down sampling comparator 150 immediately falls to Low. Thus, the VOUTS signal, which is an analog signal, is converted into a 1-bit binary signal.

Swing detector 44 further includes: a battery box 140 operatively coupled to power key 90; a voltage regulator circuit 142 for regulating the voltage outputted by battery box 140 and for supplying power to MCU 148 and other circuits in swing detector 44 via power lines; and a power control switch 144 that, under control of MCU 148, supplies the power from voltage regulator circuit 142 to CIS 146. Power control switch 144 and CIS 146 receives control commands from MCU 148 via a control bus 149. Outputs of CIS 146 and down sampling comparator 150 are connected to the input of MCU 148 via a data bus 151.

Figure 6:
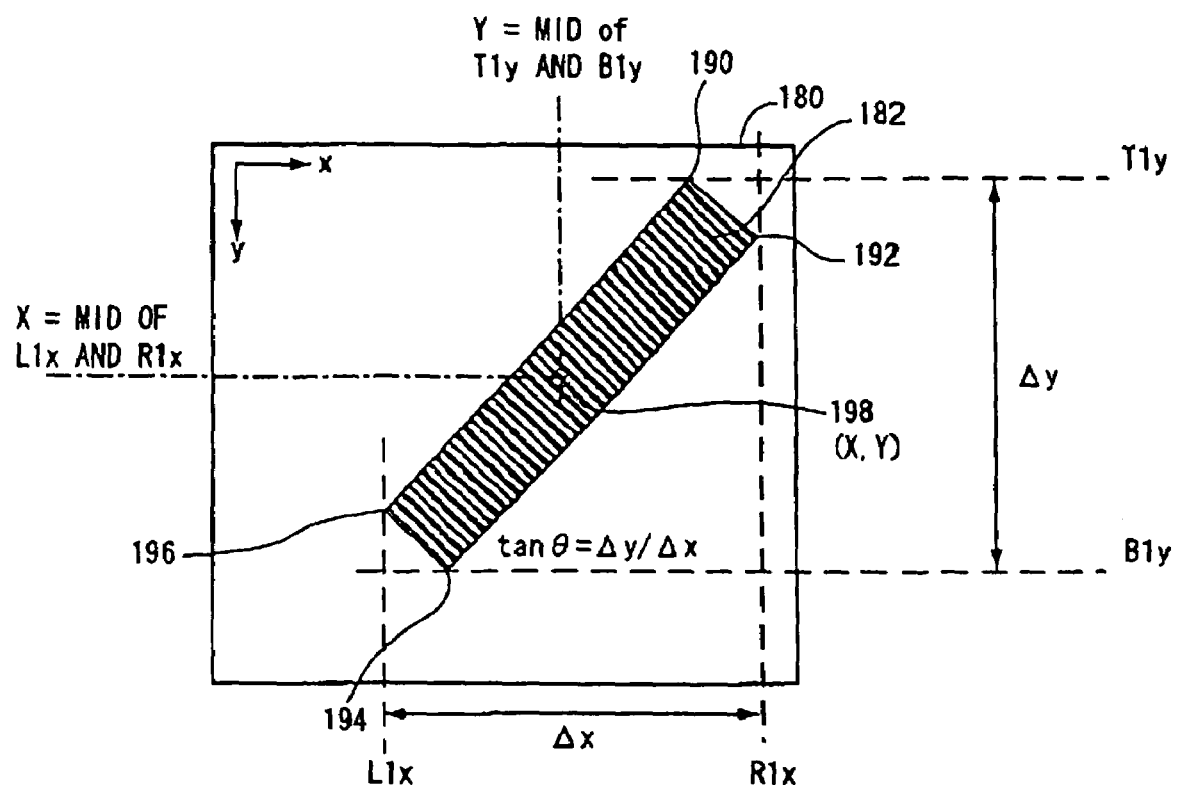
FIG. 6 schematically shows the image plane of CIS 146 of the swing detector 44 shown in FIG. 5 and an image of a reflector strip 124 of the controller 42 shown in FIG. 4.

Referring to FIG. 6, MCU 148 finds the angle θ which one of the edges of an image 182 of reflector strip 124 forms with one of the edges of an image plane of CIS 146 in the following manner. First, MCU 148 scans an image 180 captured by CIS 146 row by row from the top to the bottom searching for the image 182 of reflector strip 124. The first bright point at a row with a y-coordinate T1y indicates the top most corner 190 of the image 182. For that purpose, a coordinate system is defined on the image 180 (i.e., on the image plane of CIS 146). Likewise, MCU 148 scans image 180 column by column from the rightmost column until it finds the rightmost bright point. This point indicates the column with an x-coordinate value R1x of the corner 192 of the image 182. In a similar manner, MCU 148 finds the leftmost bright point 196 with an x-coordinate L1x and the bottom bright point 194 with a y-coordinate B1y. Here, T1y>B1y holds. Likewise, R1x>L1x holds. In other words, in this operation, the four points 190, 192, 194 and 196 closest to respective edges of image 180 from the respective edges of the image 182 are detected and then their x- or y-coordinate values are computed.

Points 190, 192, 194 and 196 correspond to the four corners of image 180 of reflector strip 124. The coordinates (X, Y) of the center point 198 of the image 182 of reflector strip 124 are then computed by:

$$X=(L1x+R1x)/2$$

$$Y=(T1y+B1y)/2.$$

The angle θ, which the longer edge of image 182 of reflector strip 124 makes with the x-axis, is determined by:

$$\tan\theta = \Delta y/\Delta x$$
$$= (B1y - T1y)/(R1x - L1x),$$
$$\therefore \theta = \tan^{-1}\frac{B1y - T1y}{R1x - L1x}.$$

By the above-described simple computation, the position of the center point 198 of reflector strip 124 and its angle θ between the x-axis can be computed. This requires a relatively small amount of computation compared with the prior art.

Figure 7:
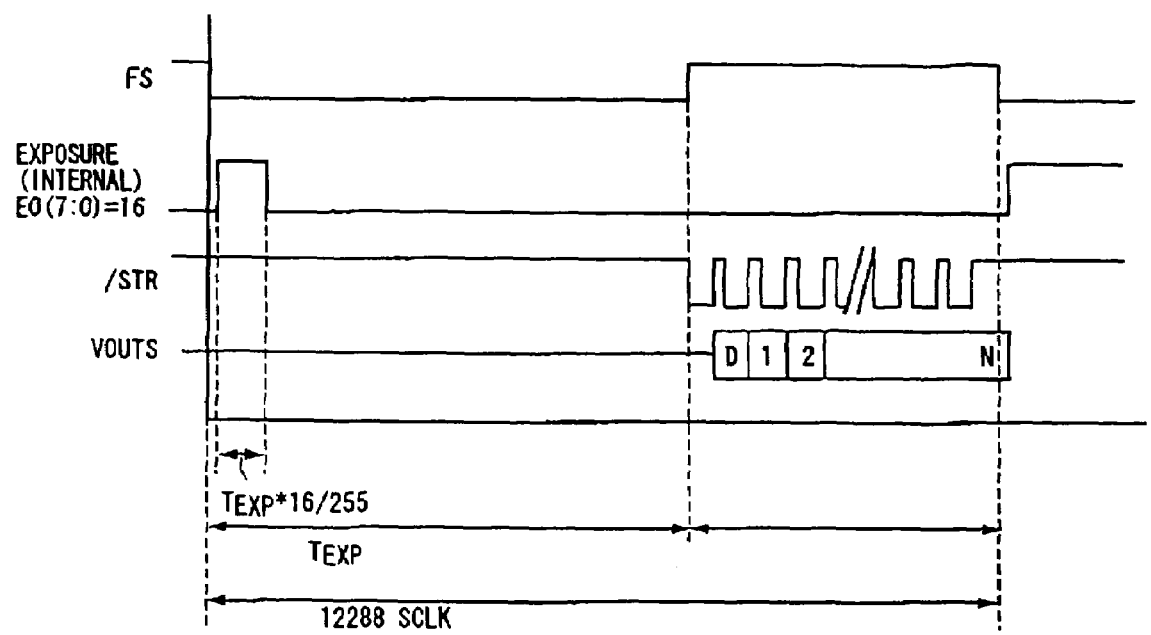
FIG. 7 is a waveform diagram that shows the timing settings of the FS, /STR, and VOUTS signals within swing detector 44 shown in FIG. 3.

FIG. 7 shows the waveforms of the signals among CIS 146, MCU 148 and down sampling comparator 150 shown in FIG. 5. Referring to FIG. 7, "FS" is a frame signal for synchronization of circuits external to CIS 146. One cycle period of signal FS is predetermined by a clock signal (SCLK) and, in this embodiment, it equals to 12288 clock cycles. In this embodiment, CIS 146 captures an image while signal FS is at the Low level. This period will be called an exposure time "Texp" hereinafter. When CIS 146 is ready to output the captured image signal, signal FS is at the High level.

A time period of CIS 146 for capturing an image (hereinafter "internal exposure time") depends on the settings of a specific 8-bit register E0(7:0) internal to CIS 146. The settings may be externally changed. The exposure time Texp is divided into 255 (=2*) parts. CIS 146 determines the internal exposure time by the Texp times register value E0(7:0) divided by 255. Thus, if the register value E0(7:0) is 16, the internal exposure time will be Texp*16/255 as shown in FIG. 7.

When signal FS is at the High level, i.e., signal FS indicates the data transfer period, CIS 146 is ready to transfer the captured image data VOUTS. The falling edges of signal /STR show the timings of data hold and sampling of VOUTS at down sampling comparator 150. During the data transfer period, signal /STR includes 32×32+1 pulses. At each of the falling edges of these pulses, down sampling comparator 150 samples the VOUTS signal 220, compares the level of VOUTS signal 220 with the threshold level $V_{TH}$ 221, and outputs the result as a 1-bit signal 222. The first data of VOUTS signal 220 is a dummy and is discarded; therefore, down sampling comparator 150 outputs 32×32 pixel data within the data transfer period. Incidentally, VOUTS signal 220 is the analog signal indicative of the intensity of the captured image. Each pixel data of VOUTS signal 220 is converted to the 1-bit digital signal 222 and is supplied to MCU 148.

Because the image signal is reduced to 32×32 pixel signals each of which is one bit, memory capacity of MCU 148 required for storing the image data is substantially reduced and an MCU with relatively low cost can be used.

Figure 8:
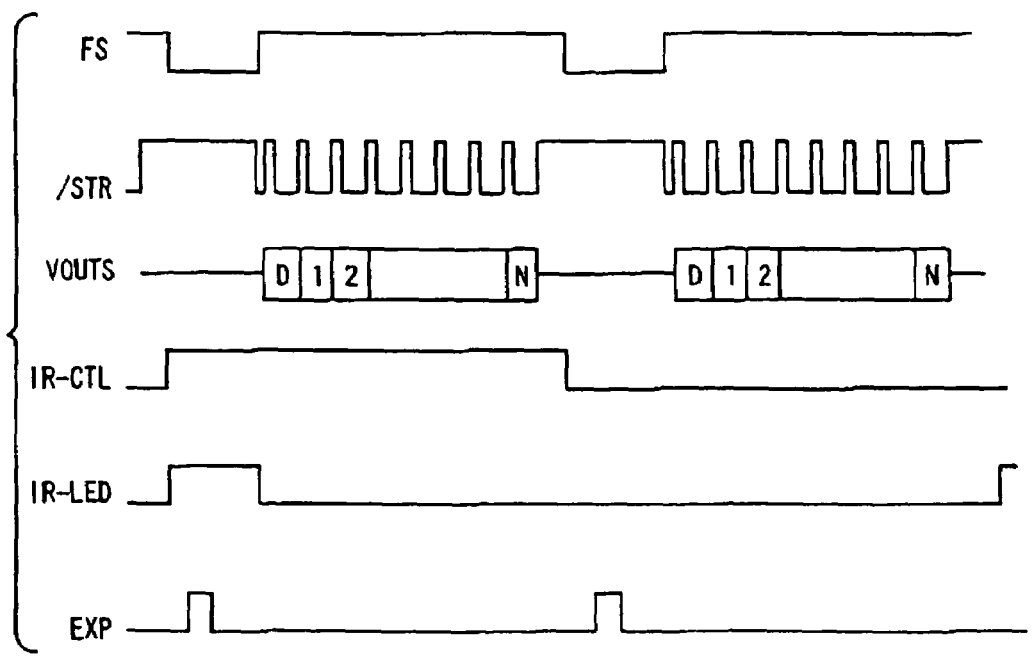
FIG. 8 is a waveform diagram of the signals within swing detector 44 shown in FIG. 3.

FIG. 8 shows IR-CTL, IR-LED, and EXP signals for controlling the exposure of the CIS 146, in addition to FS, /STR, and VOUTS signals.

The IR-CTL signal alternately assumes the High level and the Low level in synchronous with the falling edges of the FS. When the IR-CTL signal is at the High level, IR LED's 94 and 96 are allowed to emit IR lights. Otherwise, they are prohibited.

The IR-LED signal assumes the High level when the FS signal is at the Low level and the IR-CTL signal is at the High level and drives The IR LED's 94 and 96. Otherwise, IR-LED signal remains at the Low level and the IR LED's 94 and 96 do not emit light.

An EXP signal defines the internal exposure time. When the EXP is at the High level, CIS 146 captures the image. The EXP attains the High level in response to each of the FS signal's falling edges. The internal exposure time is defined by the Texp times register value, as described above.

In summary, for each cycle of the IR-CTL signal, two images are captured by CIS 146; one is captured during IR LED's 94 and 96 are emitting IR light and the other is captured during IR LED's 94 and 96 are not emitting IR light. The former is called the exposure data and the latter is called the dark data.

Figure 9:
FIG. 9 is waveform diagrams of an image signal outputted from CIS 146 to down-sampling comparator 150 shown in FIG. 5 and an image signal down-sampled by down sampling comparator 150.

FIG. 9 shows the down sampling carried out by down sampling comparator 150. VOUTS outputted from CIS 146 is an analog signal as shown in waveforms b 220 (FIG. 9(b)). Down sampling comparator 150 compares the level of VOUTS with the predetermined threshold level $V_{TH}$ 221 and outputs the resultant 1-bit binary signal as shown by the waveform 222 (FIG. 9(a)).

Note that, in this embodiment, CIS 146 captures the IR images of the objects. The IR light emitted from IR LED's 94 and 96 will be reflected by the reflector strip 124 of the controller 42 and will be captured by CIS 146. Thus, the exposure data will include the image of the reflector strip 124.

However, IR lights are abundant in the environment. For instance, the lighting facilities within a house, a hotel reception, or a convention hall will emit IR lights. Even the sun rays include IR and the sun rays incident upon CIS 146 through a window may form an image on the image plane of CIS 146. Thus, CIS 146 will receive IR lights from not only reflector strip 124 but also IR light sources other than reflector strip 124. CIS 146 must isolate the image of reflector strip 124 from those of other IR light sources.

This may be done if one uses a high-performance CPU; however, such a high-performance CPU is expensive. Electronic game apparatus should be easy to purchase and therefore, it cannot include such an expensive CPU. Thus, it is essential to isolate the image of reflector strip 124 with an inexpensive CPU. The CIS 146 of the present embodiment deals with this challenge in the following way using the exposure data and the dark data.

Figure 10:
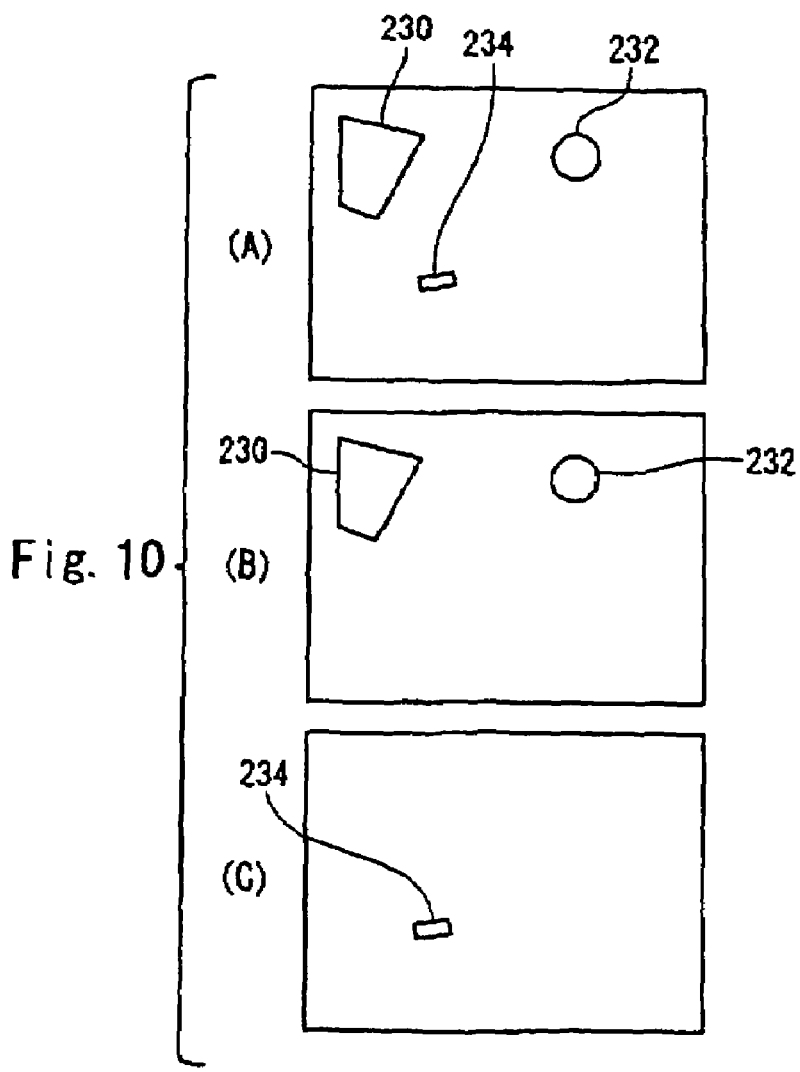
FIG. 10 schematically shows how the image of the reflector is extracted by subtracting the dark data from the exposure data.

FIG. 10 (A) shows an example of exposure data captured by CIS 146. The image includes a number of images of light sources 230, 232, and 234, of which the image 234 is that of reflector strip 124.

FIG. 10 (B) shows an example of dark data captured by CIS 146. The arrangement of the light sources is the same to that of FIG. 10 (A). Referring to FIG. 10 (B), the images of light sources 230 and 232 are still present in the dark data; however, the image 234 of reflector strip 124 is not present. This is because reflector strip 124 is a passive light source. When IR LED's 94 and 96 do not emit IR light, reflector strip 124 does not emit reflecting IR light; therefore, the dark data image does not include the image 234.

FIG. 10 (C) shows the difference between the images of FIG. 10 (A) and FIG. 10(B). As shown by FIG. 10 (C), the difference data only includes image 234 of reflector strip 124. In this manner, CIS 146 isolates the image 234 of reflector strip 124 from other images.

-Program Structure of Swing Detector 44-

FIGS. 11 to 14 show the overall control structure of the program running on MCU 148 of swing detector 44 for controlling CIS 146, capturing the image of reflector strip 124, and computing the position of its center point and its angle θ with reference to the x-axis.

Figure 11:
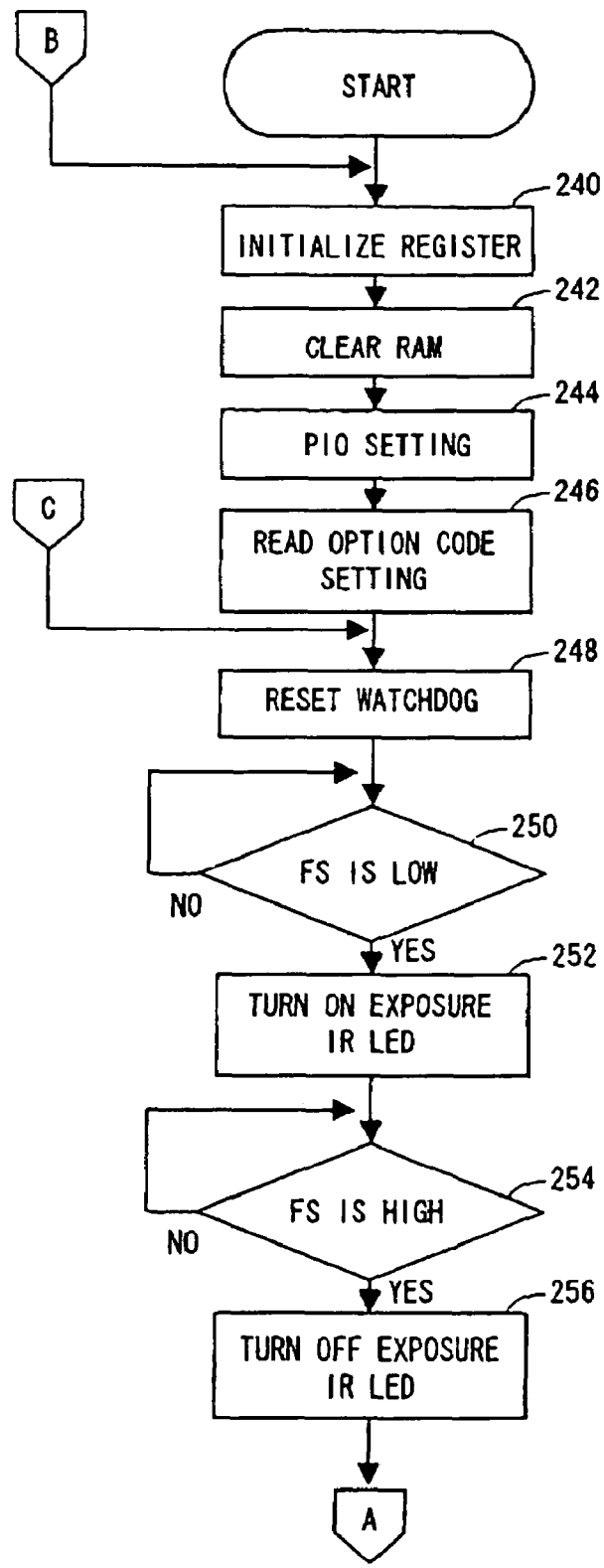
FIGS. 11 to 14 show the overall control structure of golf club detecting program running on MCU 148 of swing detector 44.

Referring to FIG. 11, after the power-on, the program starts at step 240 where registers of MCU 148 are initialized. At step 242, MCU 148 clears its RAM (random access memory). Then, at step 244, PIO (programmed input/output) setting of MCU 148 is carried out. At step 246, MCU 148 reads option code setting and resets CIS 146 and sets up registers of CIS 146 in accordance with the option code setting. At step 248, watchdog timer is reset.

At step 250, it is determined whether the signal FS is Low or not. If not, the control returns to step 250 and the determination is repeated until the signal FS is Low. When signal FS is Low, MCU 148 turns on the exposure IR LED's 94 and 96 (see FIGS. 3 and 5). At step 254, exposure IR LED's 94 and 96 are kept on until the signal FS is High. When the signal FS is found to be High, exposure IR LED's 94 and 96 are turned off at step 256.

Figure 12:
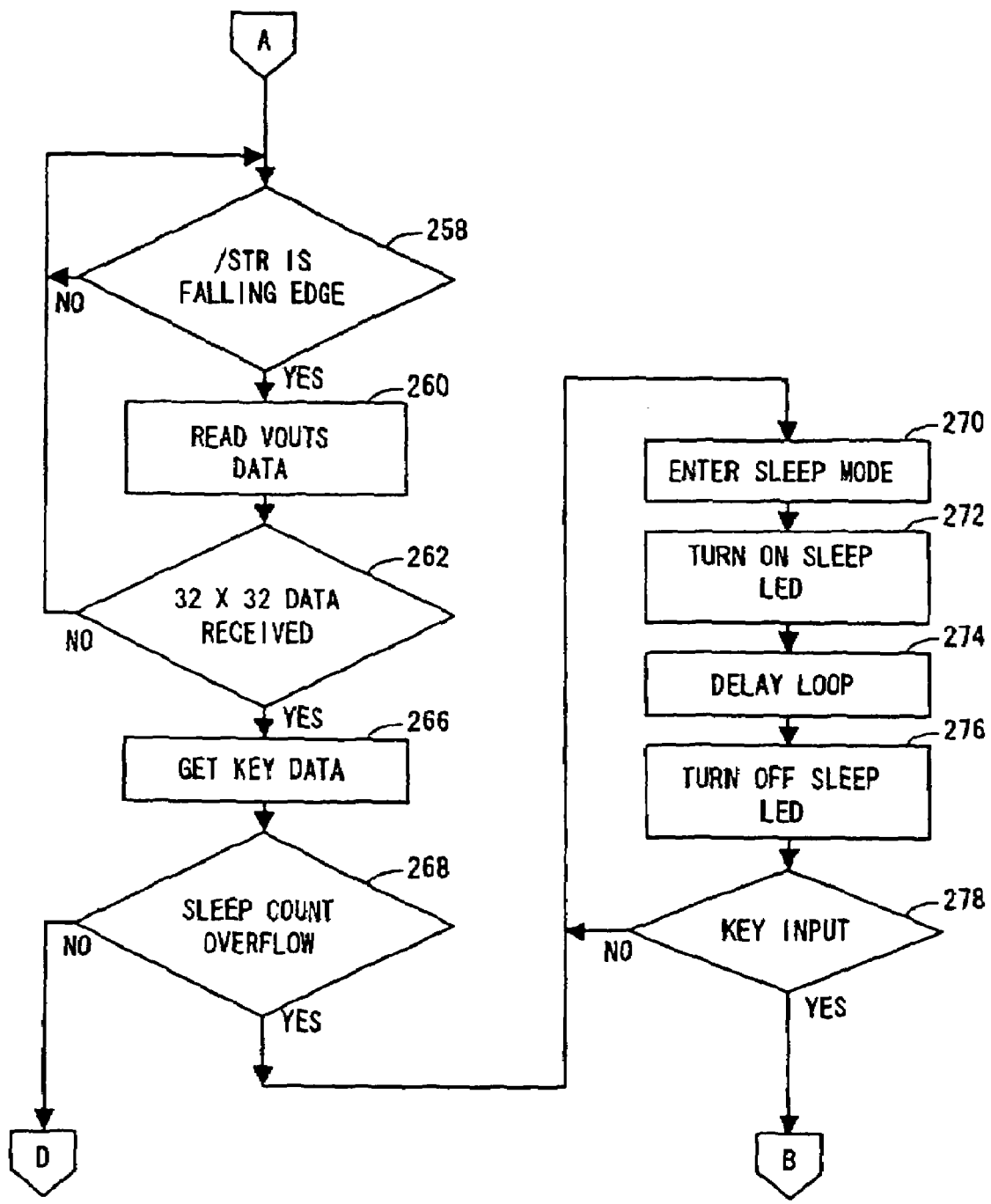

Referring to FIG. 12, MCU 148 waits until the signal /STR is at its falling edge at step 258. When the /STR is at its falling edge, MCU 148 reads the VOUTS down sampled by down sampling comparator 150 at step 260.

At step 262, it is determined whether all 32×32 data are received from CIS 146. If not, the control returns to step 258.

When all of the 32×32 data are received, the control goes to step 266. The 32×32 data received at steps 258 to 262 forms the exposure data.

At step 266, MCU 148 tries to get key press data. At step 268, a sleep counter (not shown) within MCU 148 is checked ant it is determined whether the sleep counter has overflowed or not. If overflowed, the control goes to step 270; otherwise, it goes to step 280 (FIG. 13).

At step 270, MCU 148 controls power control switch 144 to stop the power supply to CIS 146 and enters the sleep mode. At step 272, MCU 148 turns on the sleep LED, which is power LED 152 shown in FIGS. 3 and 5. At step 274, MCU 148 waits for a predetermined period by a delay loop. After the predetermined period, MCU 148 turns on the sleep LED at step 276. At step 278, it is determined whether key is pressed or not. If there is no key press, then control returns to step 270 and MCU 148 enters sleep mode again. If there is a key press, the control jumps back to step 240 and MCU 148 carries out the steps 240 et seq. again.

Figure 13:
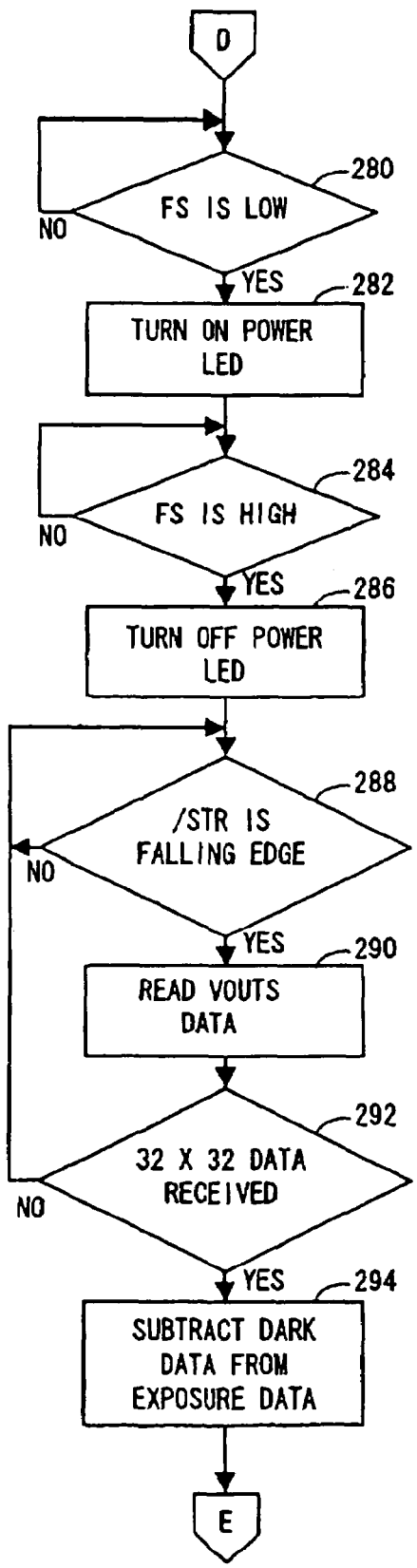

When it is determined at step 268 that the sleep counter has not overflowed, control goes to step 280 shown in FIG. 13. Referring to FIG. 13, at step 280, MCU 148 waits until the signal FS is Low. When the signal FS is Low, MCU 148 turns on power LED 152 at step 282 and waits until the signal FS is High at step 284. By turning on power LED 152, MCU 148 indicates that MCU 148 and CIS 146 are operating. When the signal FS is High, MCU 148 turns off power LED 152. By turning off the power LED 152, power consumption is reduced.

Next, at step 288, MCU 148 waits until the signal /STR is at is falling edge. When the signal /STR is at its falling edge, MCU 148 again reads VOUTS data at step 290. Steps 288 and 290 are repeated until it is determined that 32×32 data are received at step 292. The 32×32 data received at steps 288 to 292 form the dark data. Then, the control goes to step 294, where MCU 148 subtracts the dark data from the exposure data. By this operation, images of light sources other than reflector strip 124 are removed from the 32×32 exposure data. Control goes to step 296 shown in FIG. 14.

At step 296, it is determined whether there is no bright point in the image or any key press. If there is a bright point or a key press, control goes to step 298; otherwise, control goes to step 318.

At step 298, it is determined whether there is no bright point in the image but a key press. If there is no bright point but a key press, control goes to step 314; otherwise, control goes to step 300.

At step 300, MCU 148 scans the 32×32 image from top to bottom row until it gets the topmost bright point T1y. At step 302, MCU 148 scans the image from bottom to top row to get the bottommost bright point B1y. At step 304, MCU 148 scans the image from left to right column to get the leftmost bright point L1x. Finally, at step 306. MCU 148 scans the image from right to left column to get the rightmost bright point R1x.

At step 308, MCU 148 calculates center point (X, Y) of the image of reflector strip 124 by the following equations (1):

$$X = (L1x + R1x)/2$$
$$Y = (T1y + B1y)/2 \qquad (1)$$

At step 310, it is determined whether the game is in an angle mode where the angle of the clubface is considered in the golf game. If it is not in the angle mode, control goes to step 314; otherwise, control goes to step 312 where club angle θ is calculated by the following equation (2):

$$\theta = \tan^{-1}(B1y - T1y)/(R1x - L1x) \qquad (2)$$

Then control goes to step 314. At step 314, MCU 148 sets up the IR output pattern for the IR communication to adaptor 4G in accordance with the computed result.

The data format of the position data and angle data for IR communication includes 22 bits. The first bit is a start bit, which is always is 1. The next thirteen bits represent the X and Y coordinates of the center point including parity bits. Because X and Y are in the range from 0 to 31 (32 pixels), it requires 5 bits to represent each of the X and Y coordinates. The parity bits include three bits.

Figure 20:
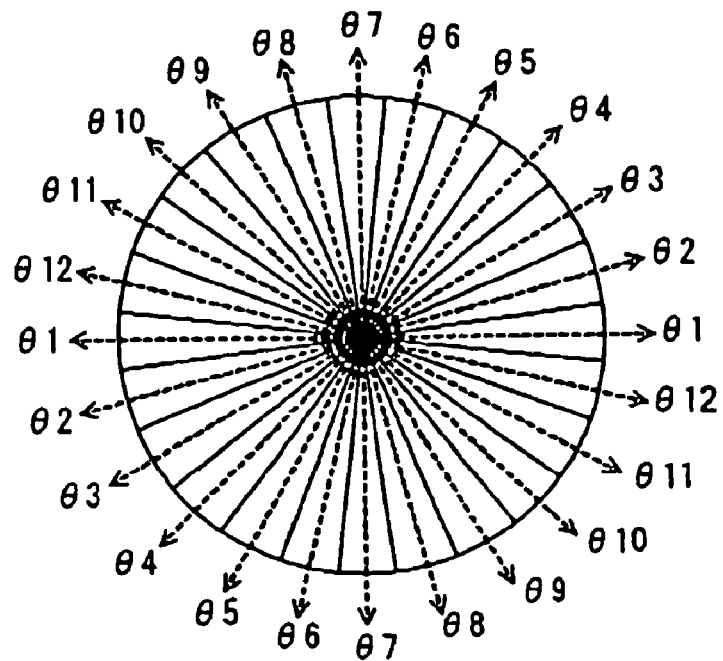
FIG. 20 shows directions of a clubface that can be detected by swing detector 44.

The next four bits represent the club angle. The angle computed at step 312 is rounded to the nearest 15 degrees (15°) as shown by the twelve angles $\theta_1$ to $\theta_{12}$ in FIG. 20. These angles are represented by numbers 1 to 12, respectively. Thus, the club angle requires 4 bits in transmission. In this embodiment, $\theta_1$ to $\theta_{12}$ represent 0°, 15°, 30°, 45°, 60°, 75°, 90°, −75°, −60°, −45°, −30°, and −15°, respectively. The conversion is carried out in the game program.

The next three bits indicates the pressed key. If no key is pressed, these three bits are not transmitted. The last bit is an end bit.

Referring again to FIG. 14, at step 316, MCU 148 resets the sleep mode counter. At step 320, MCU 148 outputs the IR data set up at step 314. The golf game program running on game cassette 76 can then utilize the data and change the game situation. After step 320, the control returns to step 248 shown in FIG. 11.

When it is determined at step 296 that there is no bright point in the 32×32 image or a key press, control goes to step 318. At step 318, MCU 148 clears the IR output pattern. Then the control goes to step 320 where the cleared IR output pattern is output to adaptor 46.

-Operation of Swing Detector 44-

Swing detector 44 of the present embodiment operates as follows. At the time of power-up, MCU 148 of swing detector 44 initializes its registers (FIG. 11, step 240), clears its RAM (step 242), sets up PIO settings (step 244), and reads option code setting and starts supplying power to CIS 146 (step 246). In response to the power supply, CIS 146 starts capturing images. During the exposure period, CIS 146 sets the signal FS at the Low level and during the transfer period, CIS 146 sets the signal FS at the High level.

At step 248, MCU 148 resets watchdog timer and waits for the signal FS from CIS 146 to be Low (FIG. 11, Step 250). When the signal FS becomes Low, this indicates that CIS 146 is in the exposure period and CIS 146 turns on IR LED's 94 and 96 for exposure. CIS 146 captures the image during the exposure time. CIS 146 waits for the signal FS to be High at step 254. When CIS 146 is ready to output the VOUTS, it sets the signal FS to the Higher level and MCU 148 turns off IR LED's 94 and 96 for exposure at step 256.

Referring to FIG. 8, during the transfer period, the signal FS stays at the High level and the signal /STR alternately attains the Low level and the High level at a specific time period. At each of the falling edges of the signal /STR, down sampling comparator 150 starts inputting data VOUTS showing the intensity of a pixel of the captured image as shown in FIG. 9(b).

The output of down sampling comparator 150 rises to the High level when the level of VOUTS is equal to or higher than the positive going threshold. It falls to the Low level when the level of VOUTS is lower than the negative going threshold. An example of the output of down sampling comparator 150 is shown in FIG. 9(a). AS described above, the positive going threshold and the negative going threshold is the same $V_{TH}$.

Referring again to FIG. 12, at steps 258 to 262, at each of the falling edges of the signal /STR, with a prescribed delay long enough for VOUTS to settle, MCU 148 reads VOUTS down-sampled by down-sampling comparator 150. When 32×32 data are received, MCU 148 tries to get key data. The received data forms the exposure data.

If sleep counter is found to have overflowed at step 268, MCU 148 enters the sleep mode until any of the keys is pressed. If sleep counter has not overflowed, MCU 148 waits until the signal FS is Low at step 280 (FIG. 13). When the signal FS is Low, CIS 146 is again in the exposure period and MCU 148 turn on power LED 152 at step 282 (FIG. 13) indicating that MCU 148 and CIS 146 are operating. Then, MCU 148 waits until the signal FS is High at step 284. During this period, CIS 146 captures the image without IR LED's 94 and 96 lighting. When the signal FS is High, CIS 146 is now in transfer mode and MCU 148 turns off power on LED 1.52.

At steps 288 to 292, MCU 148 receives the 32×32 image VOUTS data outputted from CIS 146 and down-sampled by down sampling comparator 150. The image forms the dark data.

At step 294, MCU 148 subtracts the dark data from the exposure data received at steps 288 to 292 (FIG. 13). The resulting data includes, if any, only the exposure data of reflector strip 124.

Figure 14:
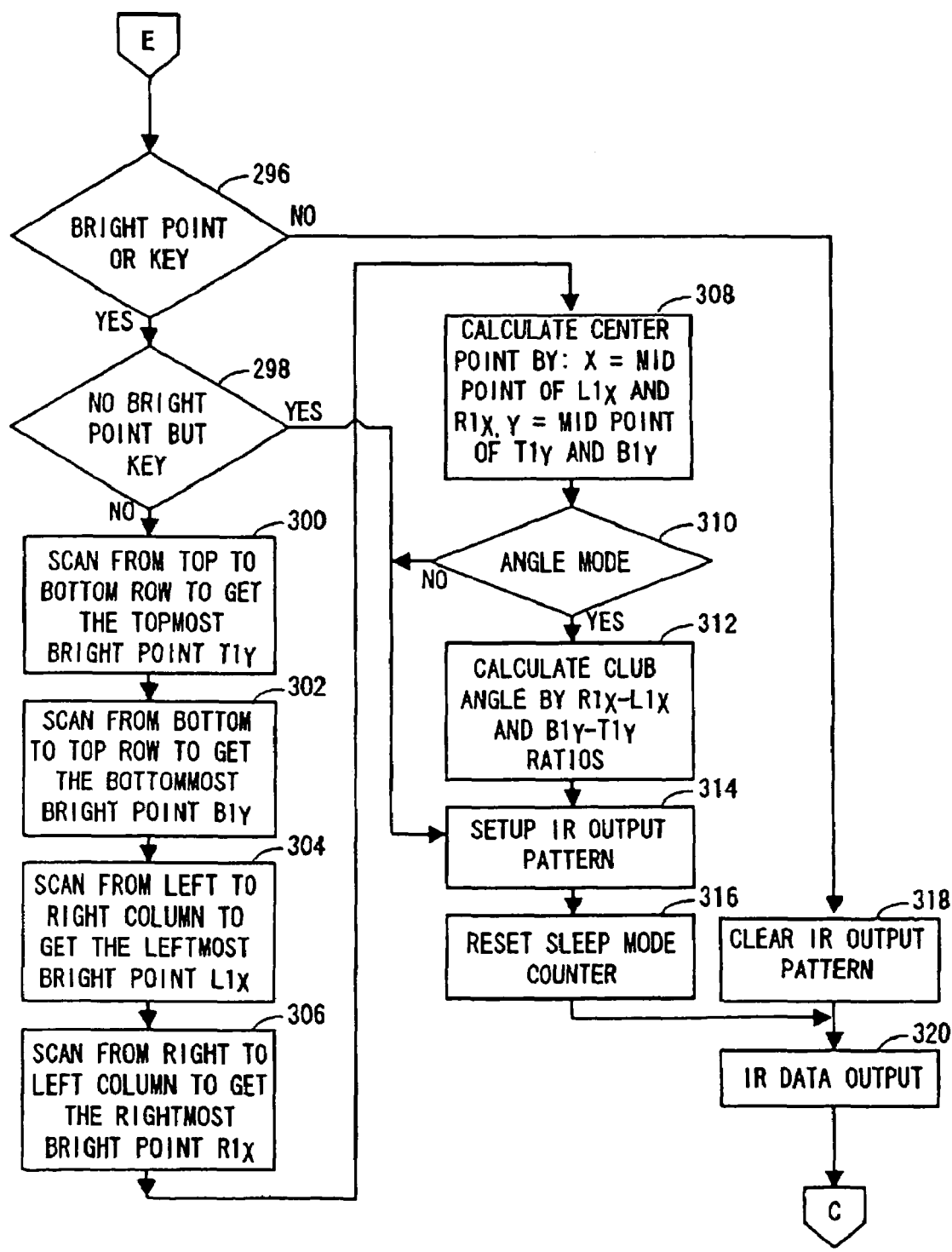

At steps 296 and 298 (FIG. 14). MCU 148 determines whether the resulting image includes a bright point and if the image includes a bright point, referring to FIG. 6, MCU 148 scans the image from top to bottom row to get the topmost bright point T1y at step 300 (FIG. 14), from bottom to top to get the bottommost bright point B1y at step 302, from left to right to get the leftmost bright point L1x at step 304, and from right to left to get the rightmost bright point R1x at step 306.

At step 308, MCU 148 calculates the coordinates (X, Y) of the image of reflector strip 124 by equations (1). If the game is in the angle mode, MCU 148 calculates club angle by equation (2).

At step 314, MCU 148 sets up IR output pattern. It resets the sleep mode counter at step 316 and outputs the IR data utilizing IR LED 106 shown in FIGS. 3 and 5 to adaptor 46 at step 320.

By repeating the above-described operation, swing detector 44 can detect the position of reflector strip 124 (FIG. 4), i.e., the position of the head of controller 42, and the club angle and transmit the detected data to adaptor 46. The adapter 46 receives the data, the game cassette 76 inserted in the adapter 46 calculates the trajectory of the imaginary golf ball, and changes the game situation.

-Use of the Club Angle-

The golf game program running on the CPU of game cassette 76 loaded on adaptor 46 can use the information of the X and Y coordinates of center of the club head and the club angle of controller 42, as in the following manner. First, by computing the difference between the coordinates detected at different times, the game program can compute the position of the center point of the club head and the angle of the clubface. Using this information, the game program can compute the direction of the imaginary golf ball trajectory.

Figure 21:
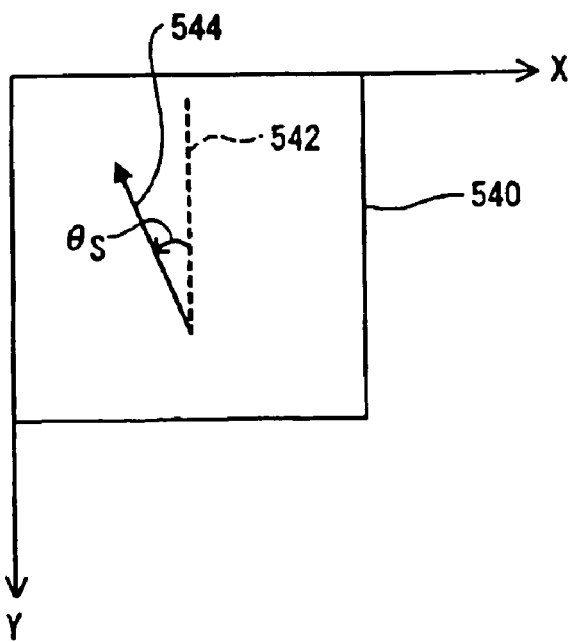
FIG. 21 shows a detected direction 344 of the movement of the golf club with reference to a predetermined reference direction 542.

In this connection, the golf game program running on game cassette 76 adopts a novel way of determining the direction of the golf ball trajectory. Referring to FIG. 21, assume that the moving direction 544 of the club head (the movement of the center point of reflector strip 124) in the 32×32 image plane 540 makes an angle $\theta_s$ with a reference line 542, which is parallel to the y-axis of image plane 540.

Figure 22:
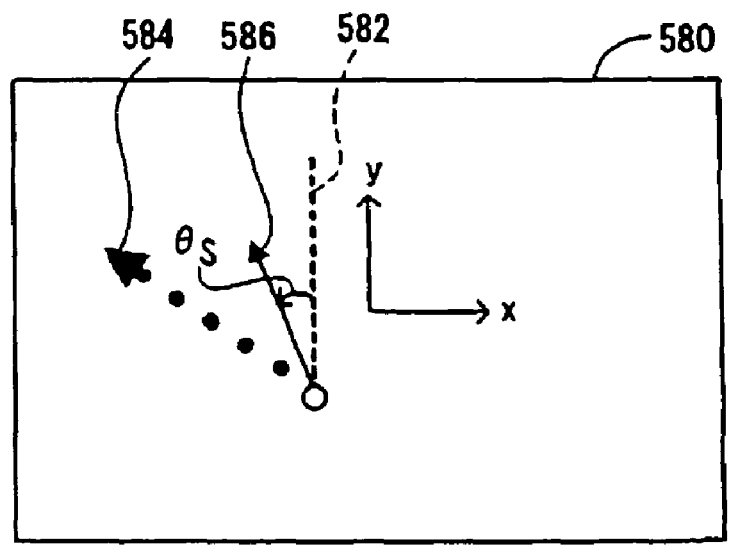
FIG. 22 shows a conventional way of determining a direction of a golf ball movement hit by a golf club.

In the prior art, as shown in FIG. 22, the golf game program screen 580 would show a target arrow 584 directed to the golf hole (not shown) and determine the trajectory of the imaginary golf ball in the direction 586 that makes the angle $\theta_s$ with the reference line 582, which is parallel to the y-axis of the screen 580.

In this arrangement, when the target arrow 584 is directed downward, the player must swing the controller backward. In some situation, the player must address the swing detector 44 facing the direction opposite to the golf game program screen 580. Further, when some obstacle is located between the imaginary golf ball and the target hole, the player might want to direct his/her ball to a direction other than the target direction. In such a situation, it will be hard to determine the right swing direction, because he/she must determine the swing direction with reference to the vertical reference line 582, which is not shown on the golf game program screen 580.

In contrast, the golf game program running on game cassette 76 determines the trajectory of the imaginary golf ball as in the following manner.

Figure 23:
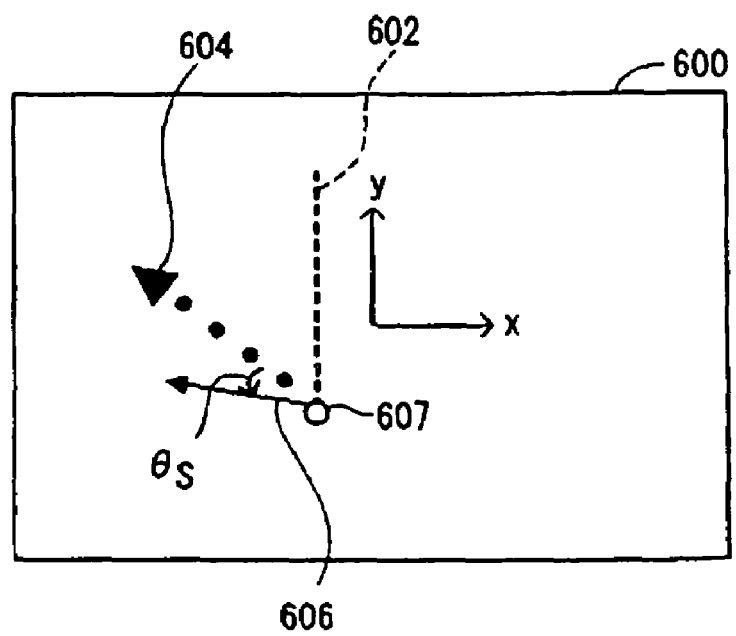
FIG. 23 shows a novel way of determining a direction of a golf ball in accordance with the first embodiment.

Referring to FIG. 23, an imaginary golf ball 607 and arrow 604 are displayed on the screen 600 of TV 48. Given the angle $\theta_s$, the golf game program in this embodiment adds the angel $\theta_s$ not to the reference line 602 of the screen 600 but to the direction of the arrow 604 that is directed to the target golf hole, resulting in the direction 606.

By this arrangement, if the player swings controller 42 in a direction of the Y-axis of image plane of CIS 146, the angle $\theta_s$ is zero; therefore, the imaginary golf ball will go in the direction of the target hole. Even if the target arrow 604 is directed downward, the player need not swing the controller 42 backward. A usual, straight swing over the swing detector 44 will make the imaginary golf ball 607 go straight in the direction of the target arrow 604. The player need not go around the swing detector 44 to find the right place for the right angle. Therefore, in contrast to the prior art, the arrangement according to the present embodiment makes it much easier to play the golf game.

Further, assume that an obstacle is located between the imaginary golf ball and the target hole. In this embodiment, it is easy for the player to determine the direction of the swing, because there is the target arrow 604 shown on the screen 600, and what is needed is to see the deviation angle that the desired direction forms with the target arrow 604. Once the deviation angle is known, the player can swing the controller 42 such that the direction of the swing makes the deviation angle with the straight swing line on the swing detector 44.

In determining the trajectory of the imaginary golf ball, the club angle is further taken into consideration in a certain play mode (the "angle mode") in this embodiment. In the angle mode, the trajectory of the golf ball is determined as shown in FIG. 25.

Figure 24:
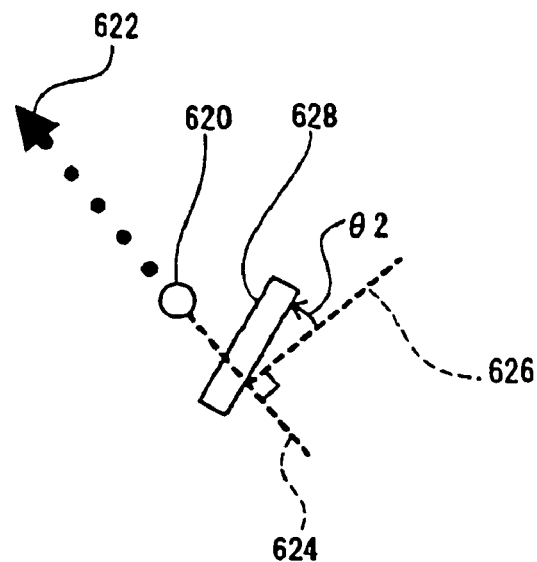
FIG. 24 shows the detected angle $\theta_2$ of the clubface in accordance with the first embodiment.

Referring to FIG. 24, let us assume that the club angle detected by swing detector 44 of the present embodiment is $\theta_2$. This means that the angle that a clubface 628 makes with the line 626 corresponding to the X-coordinate of CIS 146 is $\theta_2$. Further assuming that the player swings the controller 42 in the direction of the line 624 corresponding to the Y-coordinate of CIS 146. In the case of FIG. 23, the trajectory of the imaginary golf ball 620 is determined in the direction of the target arrow 622. But the golf game program can determine the trajectory of the imaginary golf ball 620 as in the following. Incidentally, if physical law is used in calculating the trajectory, the imaginary golf ball 620 will move in the direction corresponding to the normal line of the clubface.

Figure 25:
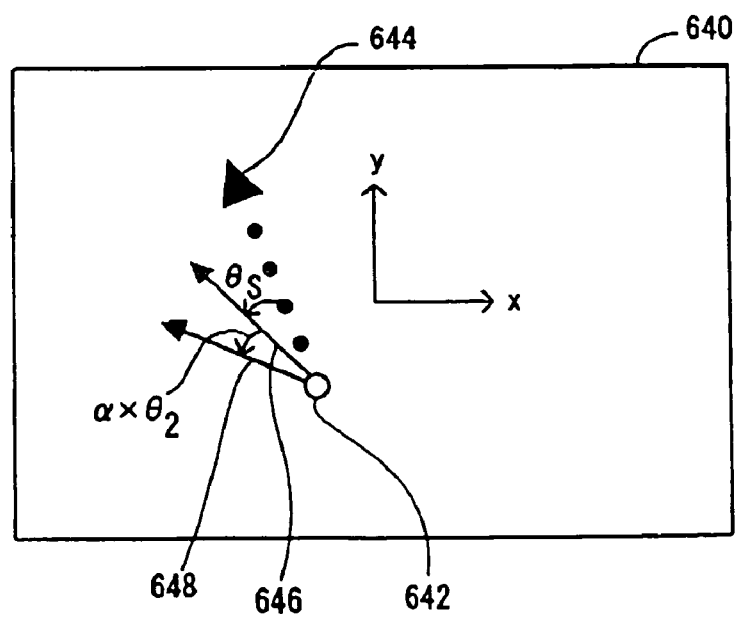
FIG. 25 shows how the direction of a golf ball in the screen is determined in the embodiment of the present invention.

Referring to FIG. 25, an imaginary golf ball 642 is displayed on the screen 640 of TV 48. Target arrow 644 is also displayed directed to the target golf hole. Given the club angle $\theta_2$ and the deviation angle $\theta_s$ of the club head movement, the program first adds angle $\theta_s$ to the angle of arrow 644. This results in the direction 646. Further, the program adds the correction value $\alpha \times \theta_2$ ($0 \leq \alpha < 1$) of the clubface angle $\theta_2$ to the direction 646, resulting in a direction 648 further deviated from target allow 644. By this arrangement, the golf game will be much more amusing than the prior art golf games.

As has been described, swing detector 44 can detect the position of the center point of the club, and further the angle of the clubface. A sequence of these data is transmitted to adaptor 46 (FIG. 1) via IR communication. Thus, the golf game program running on the CPU of game cassette 76 mounted o adaptor 46 can utilize these data and the resultant golf game will be more amusing than the prior art.

-Control Structure of the Golf Game-

Figure 15:
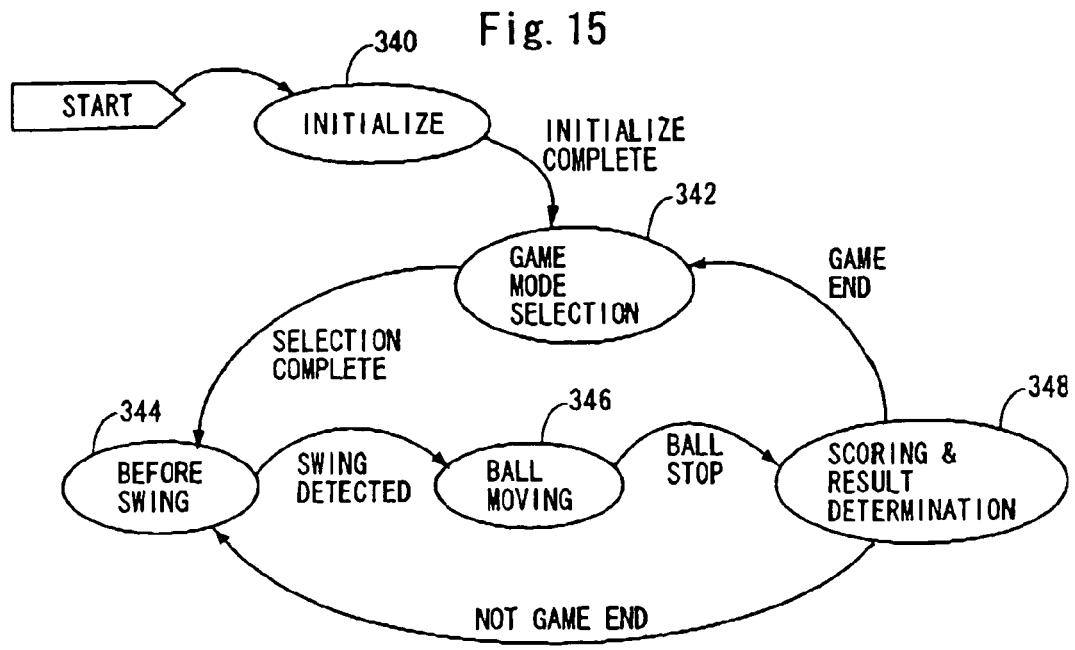
FIG. 15 shows the status transition diagram of a golf game program that is stored in game cassette 76.

The golf game program running on the CPU of game cassette 76 of adaptor 46 uses the information from swing detector 44 to control the game process. FIG. 15 shows a state diagram of the golf game program.

Referring to FIG. 15, the game starts at the initialize state 340. After completing initialize state 340, the game enters game mode selection state 342. Here, the game program shows a menu on the screen of TV 48. The menu will show a number of games of which settings are different. After the user selected a desired game, the game enters a "before swing" state 344.

In "before swing" state 344, the game determines whether the user swings controller 42 using the data from swing detector 44. If a swing is detected, the game enters a ball moving state 346, where the game computes the direction and speed of the imaginary ball and then compute the trajectory of the ball in the imaginary golf course. In this state, the golf game generates a sequence of images that show the movement of the imaginary golf ball together with the changing background scene of the golf course.

When the imaginary ball comes to a halt, the game enters a scoring and result determination state 348. Here, the game determines where the imaginary golf ball lies and computes the score of the user.

If it is determined that the game comes to an end, the game goes back to game mode selection state 342. If it is not, the game goes back to before swing state 344.

Figure 16:
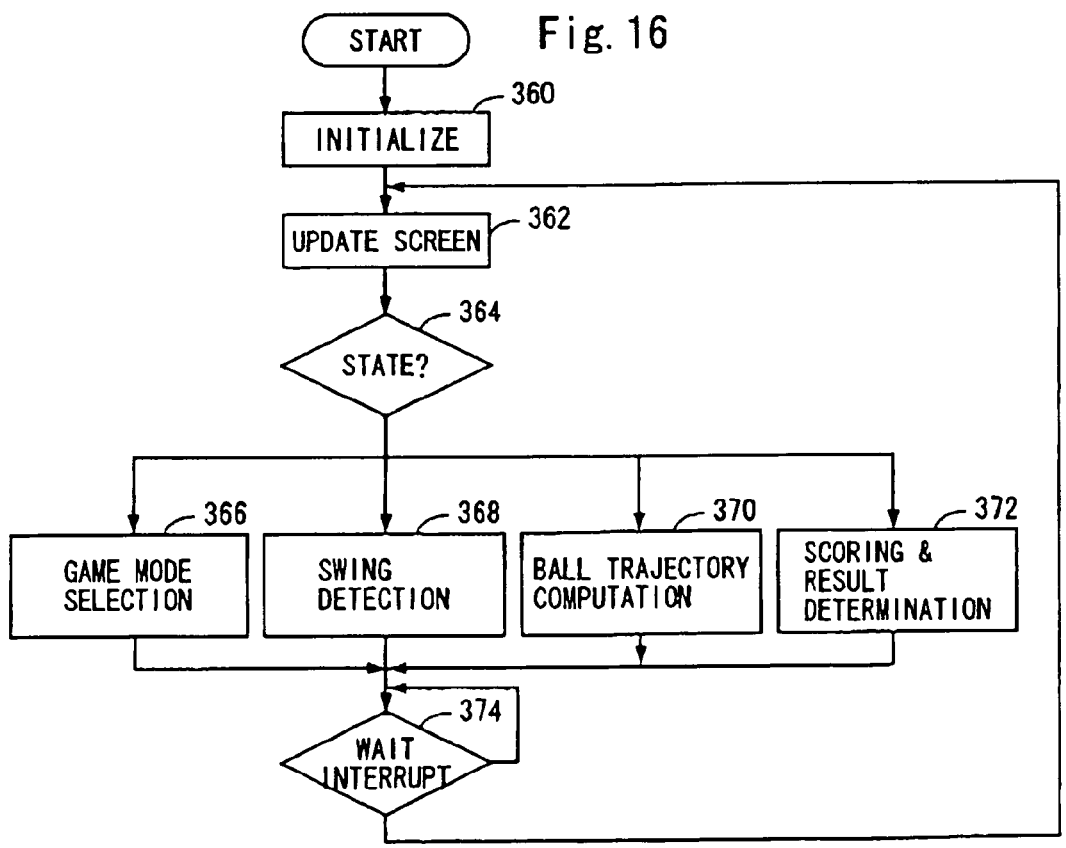
FIG. 16 shows a main routine of the golf game program.

FIG. 16 shows overall control structure of the game program as described above. Referring to FIG. 16, when the game program is activated, it initializes the memory and registers with predetermined initial values and sets the game mode to "game mode selection" at step 360. At step 362, the game updates the screen of TV 48 in accordance with the status of the game.

At step 364, the game checks the game state and goes to step 366, 368, 370, and 372, respectively, if the game is at the game mode selection state 342, before swing state 344, ball moving state 346, and scoring and result determination state 348, respectively. The details of steps 366 and 368 will be described later with reference to FIGS. 17 and 18, respectively. Steps 370 and 372 are not relevant to the present embodiment and therefore, the detailed description of them will not be given here.

After steps 366, 368, 370, or 372, the control goes to step 374, where the program waits for a wait interrupt, which is issued by a timer (not shown). The timer will issue the wait interrupt at a predetermined period. Thus, the golf game repeats the steps 362 to 374 for each timer interval.

Figure 17:
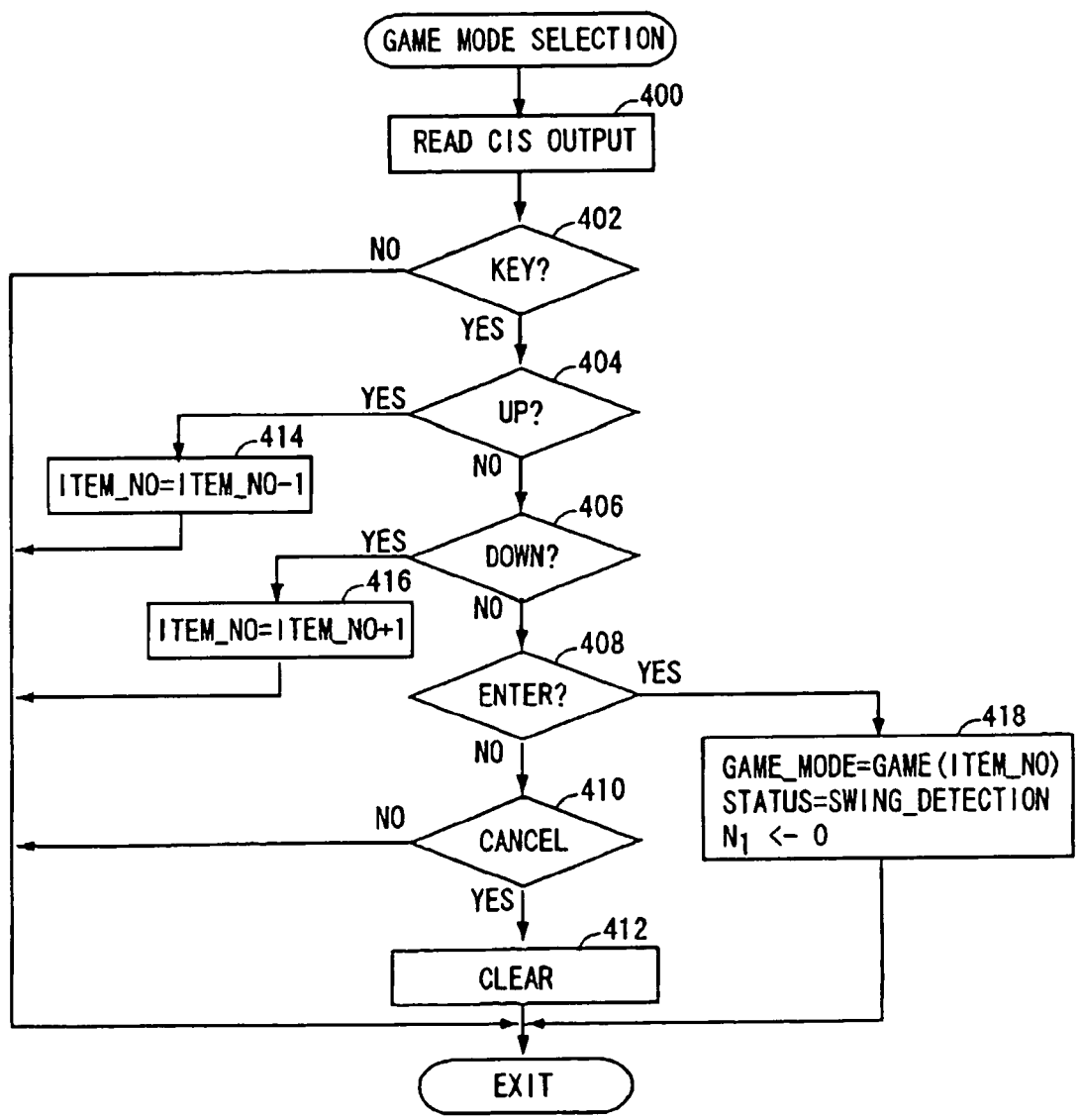
FIG. 17 shows the control structure of the game mode selection process in the golf game program.

FIG. 17 shows the detailed control structure of game mode selection step 366 shown in FIG. 16. Referring to FIG. 17, at step 400, the program reads the output of CIS 146. At step 402, the program determines whether the data indicates that any of the keys (buttons) 98, 100, 102 and 104 (FIG. 3) is pressed. If the data does not indicate that any key is pressed, the program exits this routine. If the data indicates that any of the keys is pressed, the control goes to step 404.

At step 404, the program determines whether the key is the "UP" button 98 (FIG. 3). If it is, the control goes to step 414, where a variable "item_no" is decremented. The variable "item_no" indicates the selected item on the menu. If the user pushes the "UP" button 98, the item that has been selected is deselected and the item just over the deselected one is newly selected. After step 414, the control exits this routine.

If it is determined that the key is not the "UP" button 98 at step 404, the control goes to step 406 where the program determines whether the key is the "DOWN" button 100 (FIG. 3). If it is, the control goes to step 416; otherwise, the control goes to step 408. At step 416, the variable "item_no" is incremented. After step 416, the control exits this routine.

At step 408, the program determines whether the key is "ENTER" button 104 (FIG. 3). If it is, the control goes to step 418; otherwise, it goes to step 410. At step 418, the program sets the game mode, the game status, and a variable $N_1$ to "game(item_no)", "swing_detection", and "0", respectively. The game( ) is an array that stores the game mode identification information. The variable "item_no" is an index into this array. By this step, the game mode is selected. After step 418, the control exits this routine. The variable $N_1$ is used in the swing detection process at step 368, the details of which will be described later.

At step 410, the program determines whether the key is the "CANCEL" button 102 (FIG. 3). If it is, the control goes to step 412, where the program clears the program settings. After step 412, the control exits this routine. If it is determined at step 412 that the key is not the "CANCEL" button, the control exits this step immediately.

Figure 18:
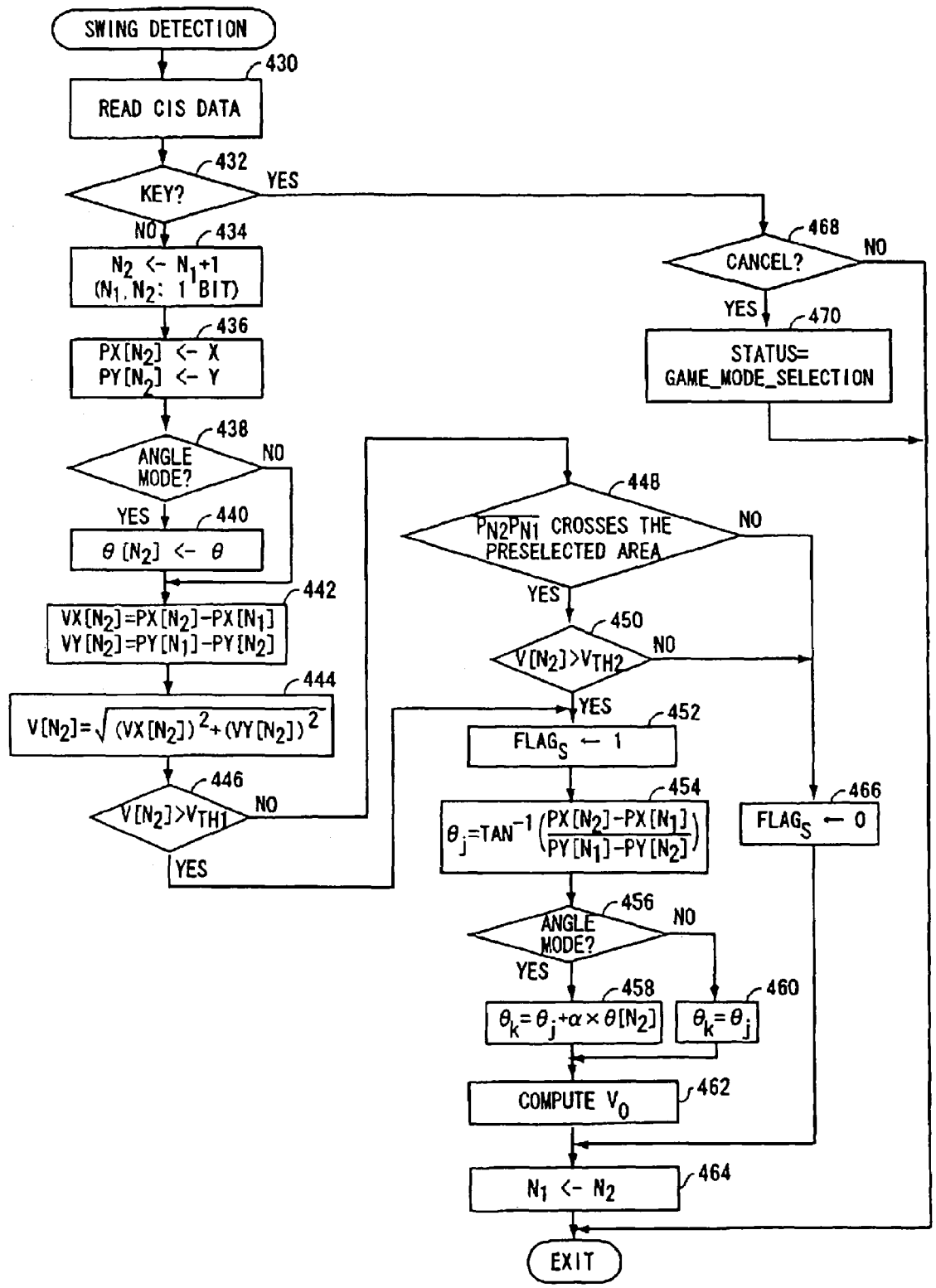
FIG. 18 shows the control structure of the swing detection process in the golf game program.

FIG. 18 shows the control flow of the swing detection process at step 368 (FIG. 16). This process determines whether the user swings controller 42 over the swing detector 44 or not.

The process starts at step 430 where the program reads CIS data. At step 432, the program determines whether the CIS data include key data that indicates that the user has pushed one of the buttons 98, 100, 102, and 104. If the CIS data includes key data, the control goes to step 468; otherwise, the control goes to step 434.

At step 468, the program determines whether the key is the "CANCEL" button 102 (FIG. 3). If it is, the control goes to step 470 where the program sets the status of the game to "game mode_selection" and exits this routine; otherwise, the program exits this routine immediately.

If the CIS data does not contain the key data, the control goes to step 434 where one is added to the variable $N_1$ and the result is stored in another variable $N_2$. Both variables $N_1$ and $N_2$ are of 1-bit variables. Thus, if $N_1$ is 0, N2 will be 1 and if $N_1$ is 1, $N_2$ will be 0.

Figure 19:
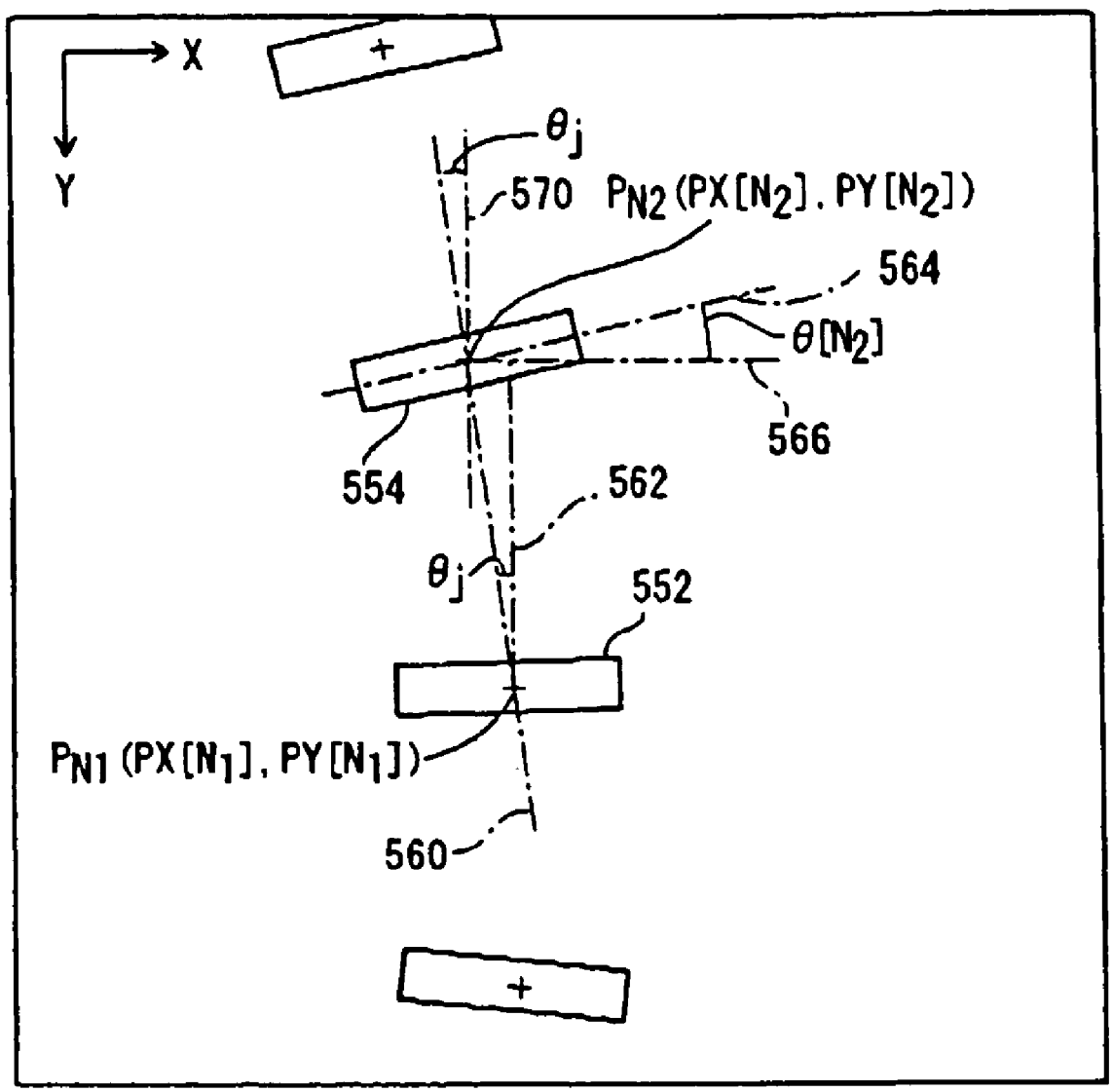
FIG. 19 shows how the angle of the clubface and the moving direction of the golf club are computed.

At step 436, the coordinate X, Y contained in the CIS data are stored in array elements PX[$N_2$] and PY[$N_2$], respectively. The arrays PX[ ] and PY[ ] have two elements; PX[0] and PX[1], and PY[0] and PY[1], respectively. FIG. 19 shows an example of the movement of the center of reflector strip 124. The center position of reflector strip 124 at the previous time 552 is indicated by (PX[$N_1$], PY[$N_1$]) while the center position at the present 554 is indicated by (PX[$N_2$], PY[$N_2$]).

At step 438, it is determined whether the game is the "angle_mode" game or not. The "angle_mode" game uses the angle θ of the clubface of controller 42. In other modes, the game does not use the angle θ. If the game is the "angle_mode" game, the control goes to step 440, where the angle θ contained in the CIS data is stored in an array element θ[$N_2$] and the control goes to step 442; otherwise the control immediately goes to step 442. θ[ ] is a two-element array and its elements include θ[0] and θ[1].

At step 442, PX[$N_2$]−PX[$N_1$] is computed and the result is stored in an array element VX[$N_2$]. Likewise, the result of PY[$N_1$]−PY[$N_2$] is stored in VY[$N_2$]. The arrays VX[ ] and VY[ ] are two-element arrays and include VX[0] and VX[1], and VY[0] and VY[1], respectively.

At step 444, $\sqrt{(VX[N_2])^2+(VY[N_2])^2}$ is computed and the result is stored in an array element V[$N_2$]. The array V[ ] is a two-element array and includes V[0] and V[1]. V[$N_2$] indicates the distance the center of reflector strip 124 has moved from the last measurement. Therefore, V[$N_2$] also indicates the speed of the movement of the head of controller 42.

At step 446, the program determines whether the distance V[$N_2$] computed at step 444 is greater than a predetermined first threshold $V_{th1}$. If it is, the control goes to step 452 where a flag, that indicates a swing has been detected is set to 1; otherwise the control goes to step 448. The flag, indicates that a swing is detected when it is 1 and indicates that the swing is not detected when it is 0.

At step 448, the program determines a line segment $\overline{P_{N2}P_{N1}}$ that connects the center point $P_{N2}$=(PX[$N_2$], PY[$N_2$]) detected this time and the center point $P_{N1}$=(PX[$N_1$], PY[$N_1$]) detected previous time. Further, the program determines whether the line segment $\overline{P_{N2}P_{N1}}$ crosses the preselected area at the center of the CIS image plane. If it does, the control goes to step 450; otherwise, the control goes to step 466.

At step 466, the flag is cleared to zero and the control goes to step 464.

At step 450, the program determines whether the distance V[$N_2$] is greater than a predetermined second threshold $V_{th2}$. The second threshold $V_{th2}$ is selected so that it is smaller than the first threshold $V_{th1}$ used in step 446. If V[$N_2$] is greater than the second threshold $V_{th2}$, the control goes to step 452; otherwise the control goes to step 466. At step 452, the flag$_s$ is set to 1 as described above.

Thus, when the detected speed of the club head of controller 42 is greater than the first threshold $V_{th1}$, the program determines that a swing is detected while if the speed of the club head of controller 42 is smaller or equal to the first threshold $V_{th1}$, the program detects a swing only when the club head goes over the center point of CIS 146 and the speed is greater than the second threshold $V_{th2}$ at the same time.

Referring to FIG. 19, the program computes the slice angle $θ_k$ in the following manner. Let us assume that the X- and Y-axes are taken as shown in FIG. 19 and that the line segment $\overline{P_{N2}P_{N1}}$ and the vertical line 562 form an angle $θ_j$. Given the two coordinate data $P_{N1}$ (PX[$N_1$], PY[$N_1$]) and $P_{N2}$ (PX[$N_2$], PY[$N_2$]), the program can calculate the angle $θ_j$ by $$θ_j = \tan^{-1}\left(\frac{PX[N_2] - PX[N_1]}{PY[N_1] - PY[N_2]}\right).$$

Note that, in FIG. 19, angles are measured in a counterclockwise direction. Let us further assume that line 564 is an extension of the longer axis of the image 554 of reflector strip, and that line 560 is an extension of the line segment $\overline{P_{N2}P_{N1}}$. The face angle θ[$N_2$], which is formed by line 564 and a horizontal line 566, is given by CIS 146.

The program further calculates an angle $θ_k$ by $θ_k=θ_j+α×θ[N_2]$, where $θ_j$ and $α×θ[N_2]$ correspond to $θ_s$ and $α×η_2$ in FIG. 25, respectively, and α is a positive constant. Preferably, α is in the range of [0,1). The program can use this angle $θ_k$ to determine the trajectory of the imaginary golf ball in the angle_mode game, as described above.

Referring again to FIG. 18, at step 454, the program computes the angle $$\theta_j = \tan^{-1}\left(\frac{PX[N_2] - PX[N_1]}{PY[N_1] - PY[N_2]}\right).$$

At step 456, the program determines whether the game is in the "angle_mode". If it is, the control goes to step 458 where $\theta_k$ is computed by $\theta_k = \theta_j + \alpha \times \theta[N_2]$; otherwise, the control goes to step 460 where $\theta_k$ is set to $\theta_j$.

Next, at step 462, the initial velocity of the imaginary golf ball $V_0$ is computed. Specifically, the imaginary golf ball will go in the direction that is deviated from the target direction by the angle $\theta_k = \theta_j + \alpha \times \theta[N_2]$.

At step 464, the program substitutes $N_2$ for $N_1$. After step 464, the control exits this routine.

In this embodiment, the angle $\theta_k$ is determined depending mainly on $\theta_j$. Therefore, the imaginary golf ball will go substantially in the direction of the swing of the controller 42. Thus, the player can enjoy the game without paying much attention to the club angle. If the club angle $\theta[N_2]$ is not zero, the course of the golf ball will deviate by the angle $\theta_k$ from the target arrow.

Further, the term $\alpha \times \theta[N_2]$ will add a touch of sophistication to the game. However, the amount of deviation with reference to the term $\alpha \times \theta[N_2]$ will not be great and the game will not be ruined. Because the club angle will affect the course of the ball, the game will be slightly hard to play, but not too hard to be entertaining.

Although the angle $\theta_k$ is determined by $\theta_k = \theta_j + \alpha \times \theta[N_2]$ in this embodiment, it may be computed based on $\theta_j$ and $\theta[N_2]$ in any way as far as the resulting game is reasonably interesting. For instance, the angle $\theta_k$ may be determined by $\theta_k = \theta[N_2] + \beta \times \theta_j$ ($0 \leq \beta < 1$) instead of $\theta_k = \theta_j + \alpha \times \theta[N_2]$. It is not necessary for the movement of the imaginary golf ball to strictly follow the physical law.

Second Embodiment

In the first embodiment, CIS 146 captures two images for each of the process cycles: the exposure data and the dark data. The outputs of CIS 146 are then down-sampled to 1-bit serial data. By computing the difference between the down-sampled images of the exposure data and the dark data, swing detector 44 can detect the position and the angle of the image of reflector strip 124.

By this arrangement, the image processing in swing detector 44 is simplified and a relatively low-performance CPU or MCU can be used.

However, in some environment where a fluctuating strong IR light source exists, there might be an error in the operation of swing detector 44 in accordance with the first embodiment. The present embodiment is an improvement to the first embodiment.

Figure 26:
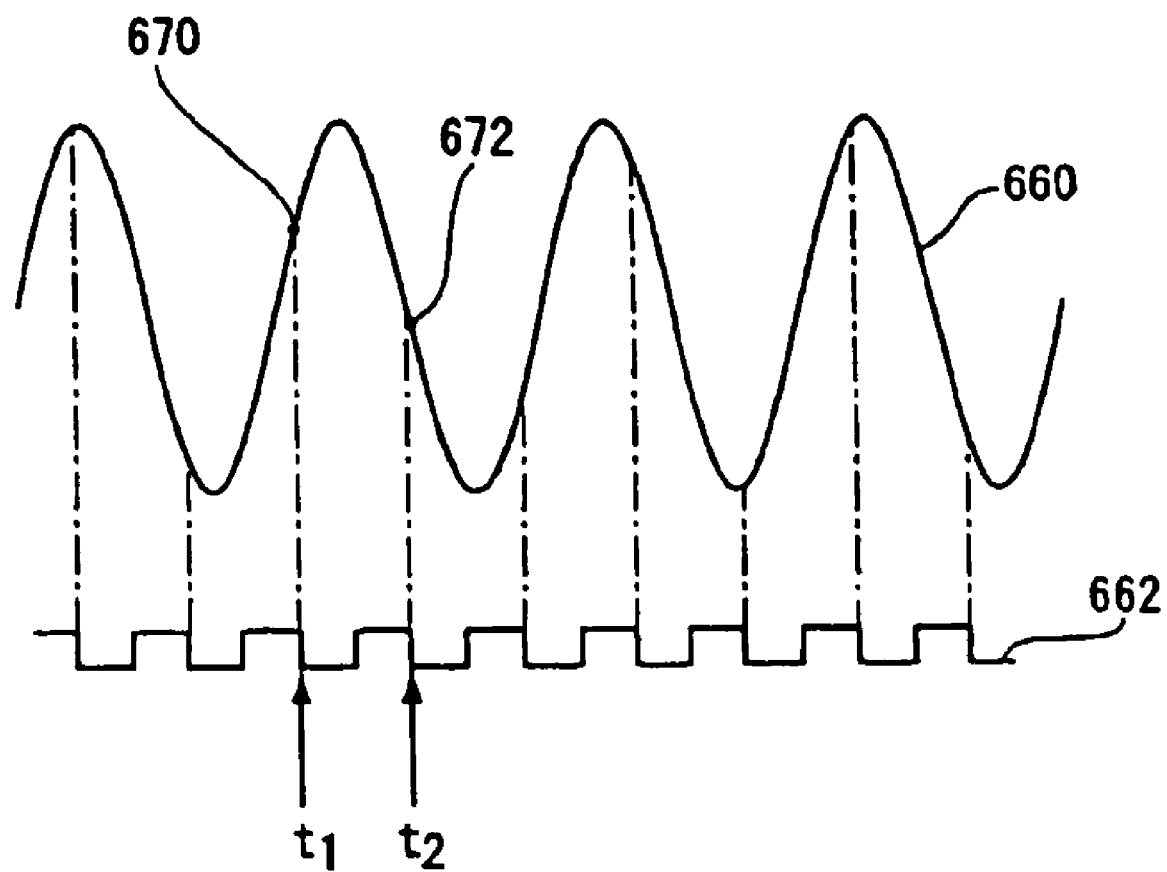
FIG. 26 shows the waveform of an IR light source and the clock signal that defines the sampling timing of CIS 146.

Referring to FIG. 26, the problem caused in such an environment will be first described. Let us assume that a clock signal 662 defines the sampling timings of CIS 146, and that an IR source near CIS 146 emits IR light with intensity that fluctuates as shown by the waveform 660. Let us assume that CIS 146 captures exposure data and dark data at time $t_1$ and $t_2$, respectively, where the intensities of the IR light from the IR source are shown by points 670 and 672, respectively.

Referring to FIG. 27(B), the exposure data 700, when down-sampled, will include an image 704 of the IR light source and an image 708 of reflector strip 124. The down-sampled dark data will include an image 706 of the IR light source as well.

FIG. 27(A) shows an example of the intensity waveform 682 of the CIS output of the pixels on line 680 shown in FIG. 27(B). Referring to FIG. 27(A). Waveform 682 will have two peaks 690 and 692 caused by the IR light source. These peaks are unwanted and should be removed by subtracting the dark data from the exposure data.

However, because the intensity of the IR light source is fluctuating, a problem will be caused. The exposure data 700 is captured when the intensity of the IR light is high while the dark data 702 is captured when the intensity is low. Thus, the height of peak 690 will be higher than that of peak 692 and, accordingly, when down-sampled at the threshold level 694, image 704 will be larger than image 706. Under the circumstances, when dark data 702 is subtracted from exposure data 700, the resulting image will be as shown by FIG. 27(C).

Note that, in the first embodiment, subtraction of pixels is carried out in accordance with the rules as shown in the table 1 below. In table 1, "1" denotes a bright pixel and "0" denotes a dark pixel. Each cell shows the result of subtracting a dark data pixel value from exposure data pixel value.

TABLE 1

|  | | Exposure Data | |
| --- | --- | --- | --- |
|  |  | 0 | 1 |
| Dark Data | 0 | 0 | 1 |
|  | 1 | 0 | 0 |

Referring to FIG. 27(C), the resulting image 710 includes: besides image 708 of reflector strip 124, a residual image 714 that reflects the difference of images 704 and 706. The program might erroneously interpret the image 714 as that of reflector strip 124, if such an error occurs, the course of the swing of controller 42 will not be properly detected and the game will be ruined. The present embodiment deals with this problem by lowering the voltage level of the exposure data by a prescribed amount such that the image of the fluctuating IR light source in exposure data will not be larger than that of dark data.

Figure 28:
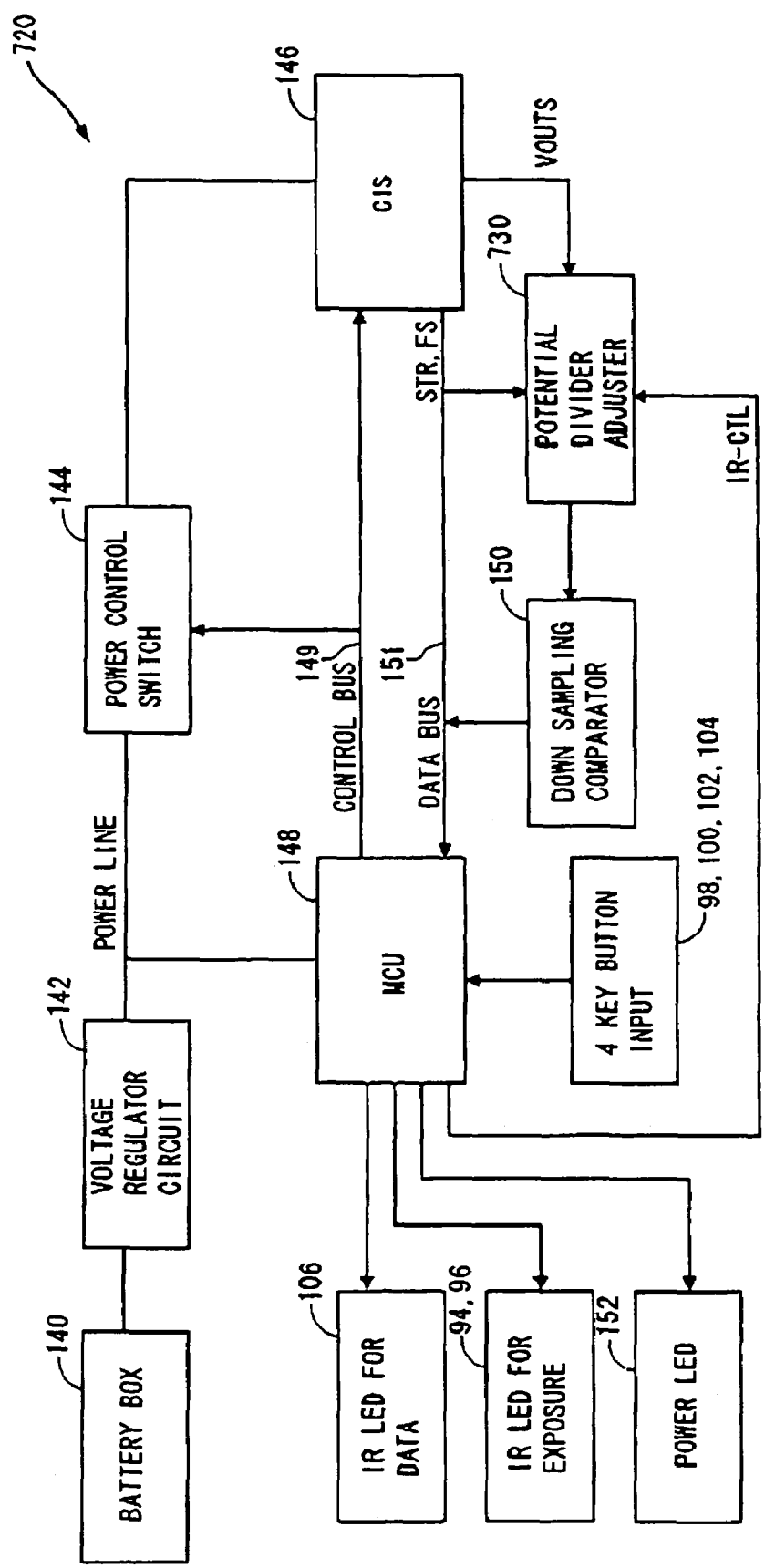
FIG. 28 shows a functional block diagram of a swing detector 720 in accordance with the second embodiment.

FIG. 28 shows a block diagram of swing detector 720 in accordance with the second embodiment of the present invention. Referring to FIG. 28, swing detector 720 differs from swing detector 44 of the first embodiment in that MCU 148 of swing detector 720 outputs the IR-CTL signal shown in FIG. 8 and that swing detector 720 further includes a potential divider adjuster 730 connected to receive the output VOUTS, /STR and FS signals from CIS 146, and IR-CTL signal from MCU 148 for adjusting the voltage level of VOUTS such that the voltage level of VOUTS supplied to down-sampling comparator 150 is low while IR-CTL signal is at the High level, and returns to the normal level while IR-CTL signal is at the Low level.

Figure 29:
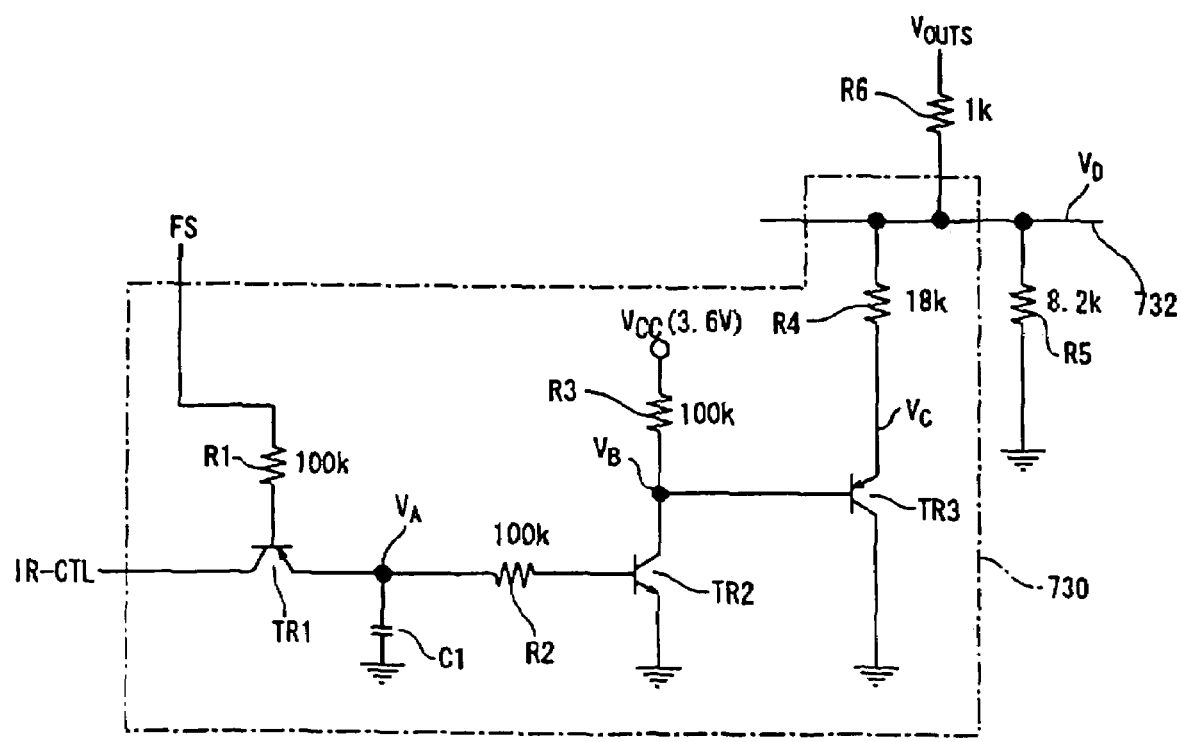
FIG. 29 shows a circuit diagram of a potential divider adjuster 730 in swing detector 720.

Referring to FIG. 29, potential divider adjuster 730 of the present embodiment includes: two PNP transistors TR1 and TR3, a NPN transistor TR2, four resistors R1 (100 kΩ), R2 (100 kΩ), R3 (100 kΩ), and R4 (18 kΩ), and a capacitor C1.

Transistor TR1 has its base connected to receive FS signal via transistor R1, its collector connected to receive IR-CTL, and its emitter connected to one end of resistor R2. Transistor TR2 has its base connected to the other end of resistor R2, its collector connected to one end of resistor R3, and its emitter grounded. The other end of resistor R3 is connected to a power supply Vcc (3.6V). Between the emitter of transistor TR1 and the ground, capacitor C1 is connected.

Transistor TR3 has its base connected to the collector of transistor TR2, its collector grounded, and its emitter connected to one end of resistor R4. The other end of resistor R4 is connected to a line 732.

There are two resistors R6 (1 kΩ) and R5 (8.2 kΩ) having respective one ends connected to line 732. Resistor R6 has its other end connected to receive VOUTS. Resistor R5 has its other end grounded. Line 732 is further connected to an input of down-sampling comparator 150 (FIG. 28).

FIG. 30 describes combinations of potential levels of IR-CTL and FS, corresponding states of transistors TR1, TR2, and TR3, the potentials VA, VB, and VC, and the combined resistance RC of resistors R4 and R5 shown in FIG. 29. VA denotes the potential at the connection of the emitter of transistor TR1 and resistor R2. VB denotes the potential at the connection of the collector of transistor TR2 and resistor R3. VC denotes the potential at the connection of the emitter of TR3 and resistor R4.

Figure 31:
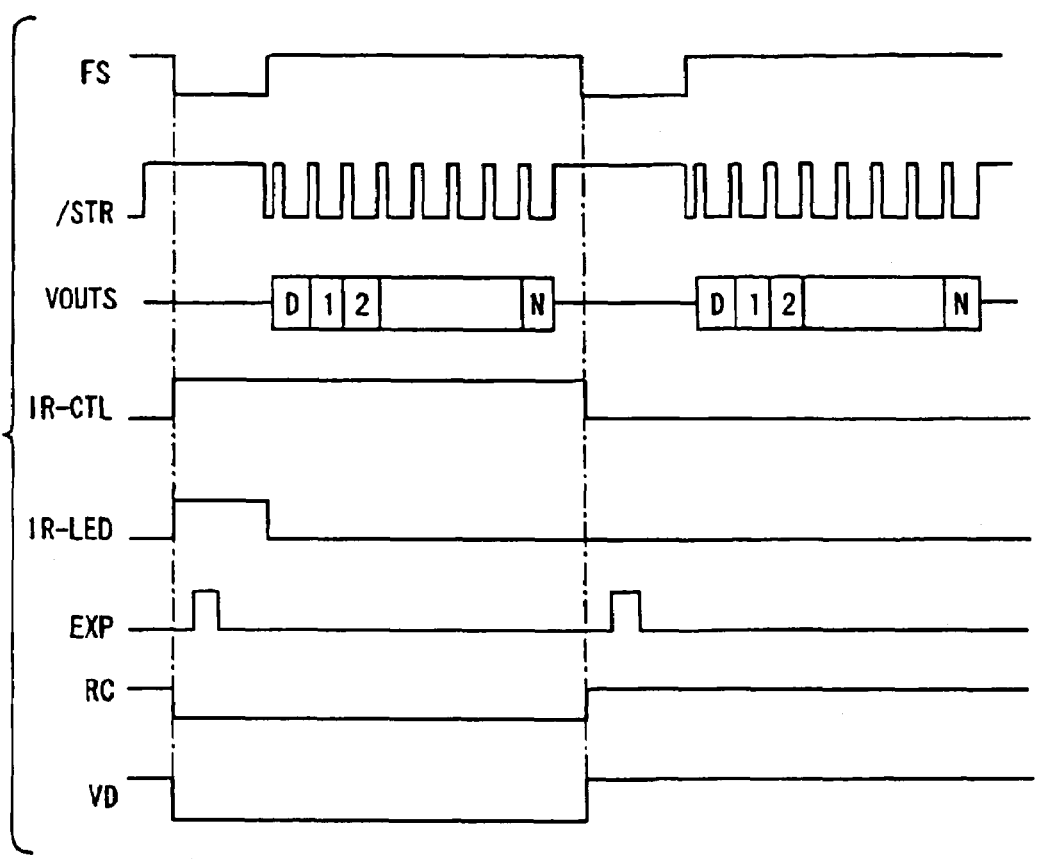
FIG. 31 shows how the problem caused by light from the IR light source is handled in swing detector 720 of the second embodiment.

As is apparent from FIG. 30, when IR-CTL is at the High level, transistor TR3 switches on the collector current. Current from VOUTS flows through transistors R4 and R5 to ground so that the potential VD (FIG. 29) becomes a relatively low level regardless of the level of FS. When IR-CTL is at the Low level, transistor TR3 switches off its collector current thereby causing the connecting node between resistor R4 and transistor TR3 at the high-impedance state. In this situation, the current from VOUTS flows through transistor R5 only, thereby the potential level VD will be relatively high. This change of the potential VD is shown in FIG. 31. Note that, in FIG. 31, "RC" denotes the combined resistance of resistors R4 and R5, which acts as a potential divider together with resistor R6.

Figure 32:
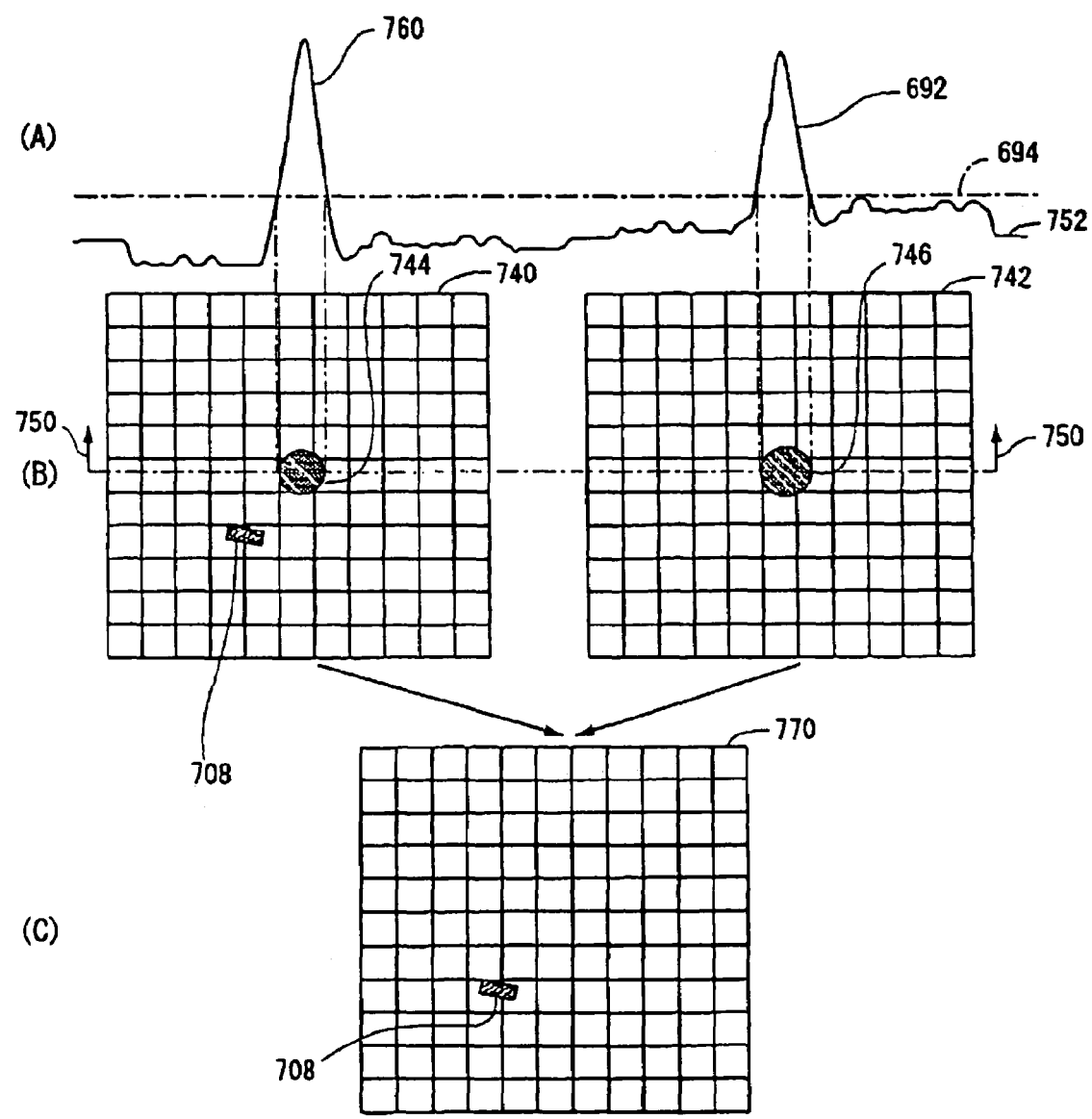
FIG. 32 shows a waveform diagram of the signals within swing detector 720.

This leads to the following result. Referring to FIG. 32(A), the first half of waveform 752 of output VOUTS of CIS 146 becomes lower than that of waveform 682 shown in FIG. 27. The latter half will be at the same level with that of waveform 682. Thus, the peak 760 caused by the IR light source will be lower than that of peak 690 shown in FIG. 27, whereas the peak 692 will not change its height.

Figure 27:
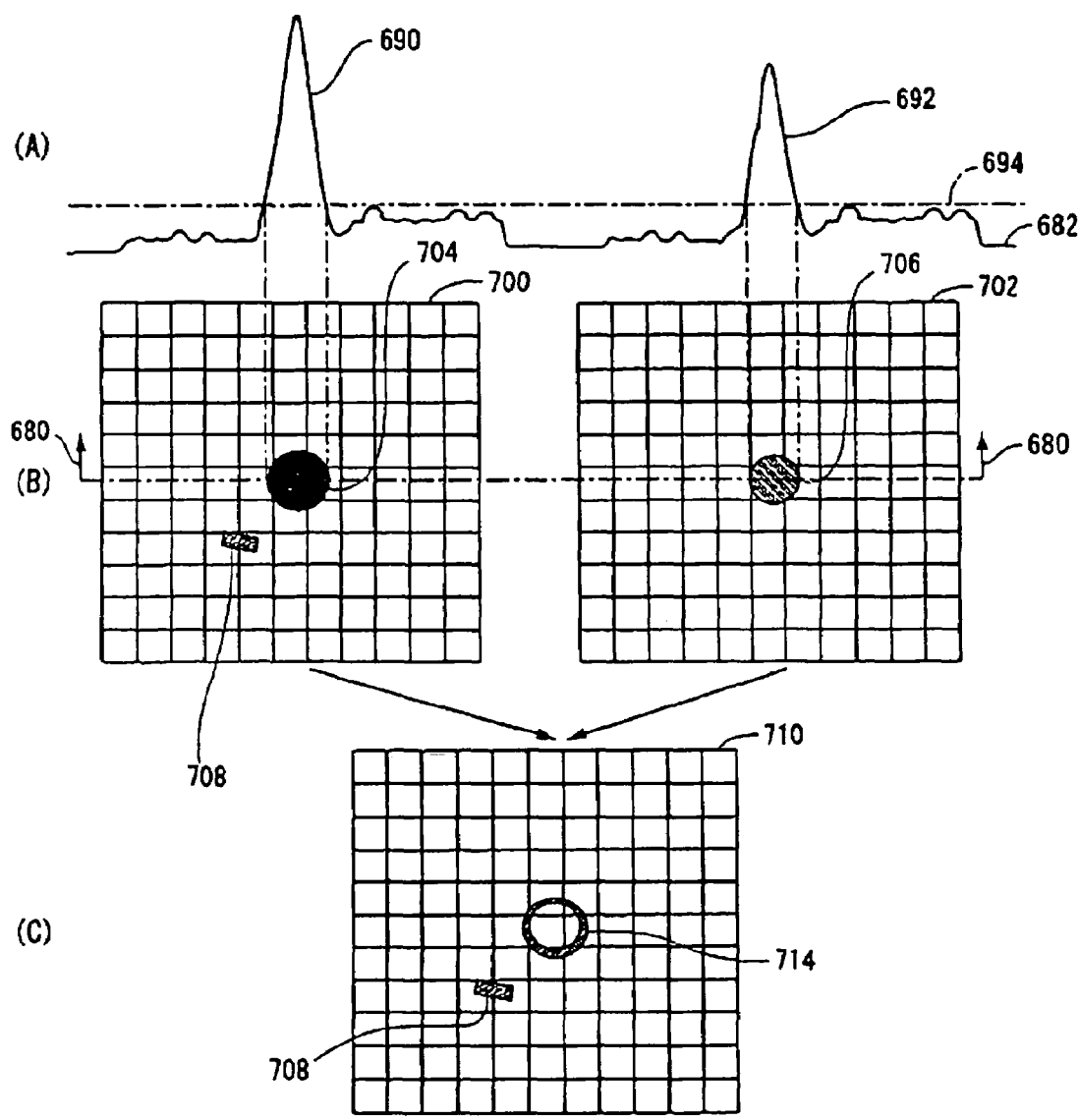
FIG. 27 shows how a light from the IR light source causes a problem in detecting reflector strip 124 in CIS 146.

Consequently, referring to FIG. 32(B), when the signal level is compared with the same threshold 694, the image 744 formed in exposure data 740 due to peak 760 will be smaller than the image 704 shown in FIG. 27 while the image 74G formed in the dark data 742 remains the same in its size. If the resistances of resistors R4, R5 and R6 are appropriately selected, the image 746 will be always larger than the image 744. By subtracting image 746 from image 744, due to the subtraction rule shown in Table 1, nothing remains as shown by difference image 770 in FIG. 32(C) thereby eliminating the problem caused by the fluctuating IR light source.

Figure 33:
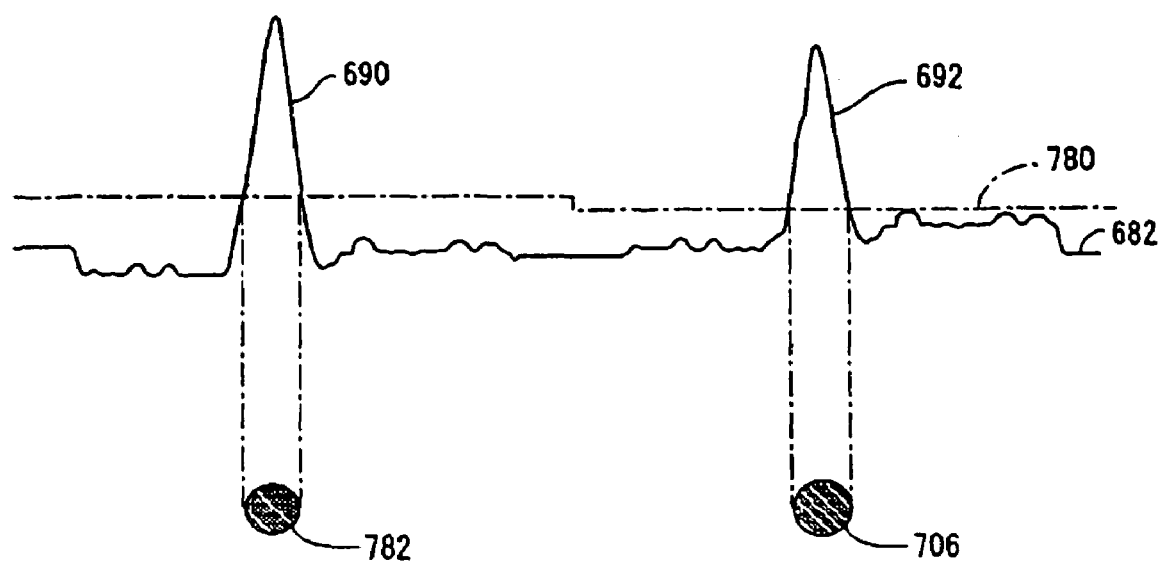
FIG. 33 shows how the problem caused by light from the IR light source may be handled in another embodiment.

In the alternative, the threshold level 694 with reference to the potential level of VOUTS may be raised in the former half of the IR-CTL cycles and lowered back in the latter half. This is shown by the waveform 682 and the variable threshold 780 in FIG. 33. Referring to FIG. 33, the threshold 780 is raised in the former half of the IR-CTL cycle and lowered back to its normal level in the latter half. The comparison between the waveform 682 and the threshold 780 is essentially the same with that of the waveform 752 and the fixed threshold 694 shown in FIG. 32(A). Consequently, the image 782 formed by the peak 690 will be smaller than the image 706 formed by the peak 692, thereby eliminating the problem caused by the fluctuating IR light source.

The above-described second embodiment implements the adjustment of the potential of VOUTS by the hardware circuit (potential divider adjuster 730); however, such adjustment may be implemented with a processor such as MCU and small amount of hardware.

Figure 34:
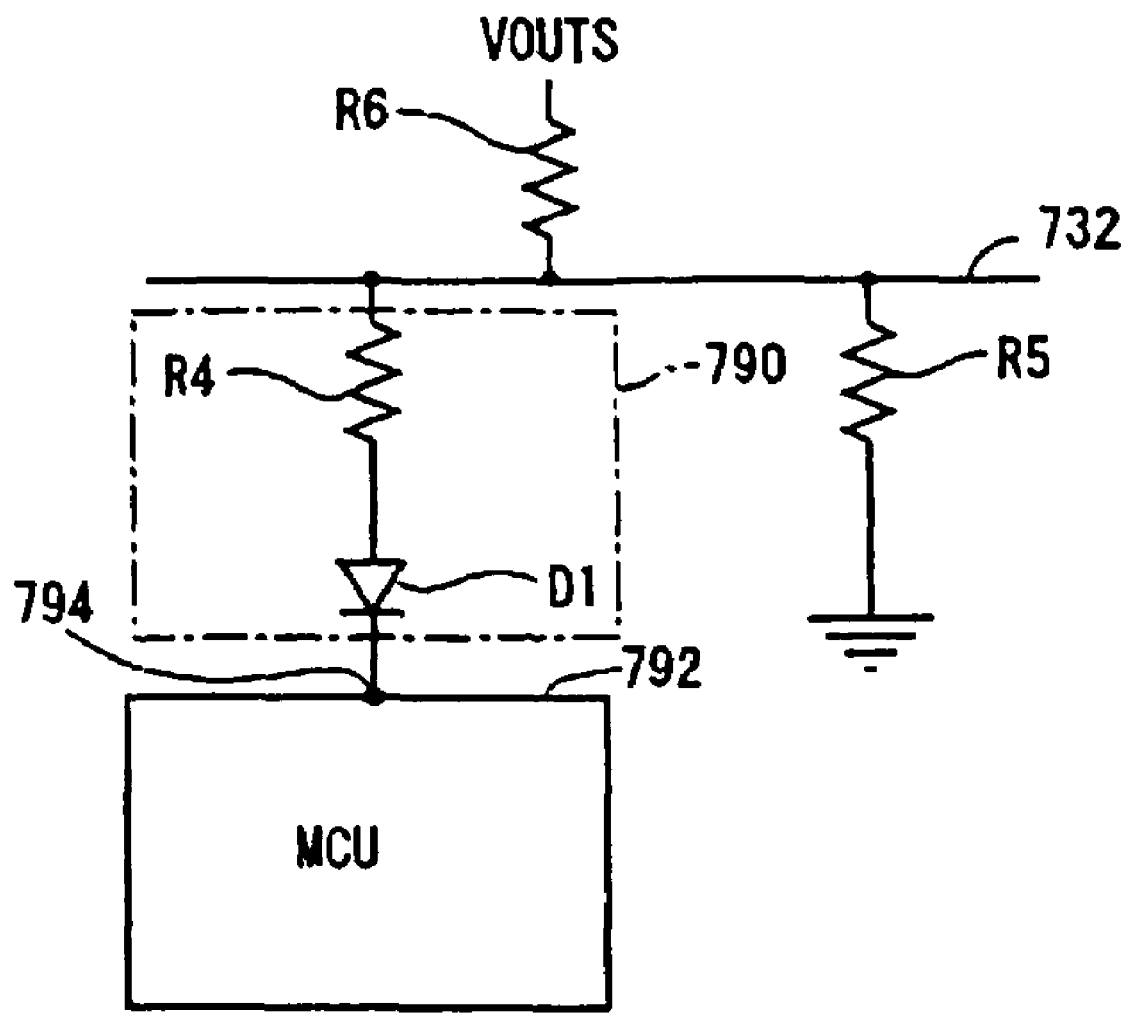
FIG. 34 shows an arrangement to handle the problem caused by light from the IR light source in still another embodiment.

FIG. 34 shows another example of potential divider adjuster. In FIGS. 29 and 34, like elements are denoted with like reference numerals. Referring to FIG. 34, this potential divider adjuster 790 includes: a resistor R4 and a diode D1 connected in a series. The anode of diode D1 is connected to one end of resistor R4. The other end of resistor R4 is connected to line 732. The cathode of diode D1 is connected to an output terminal 794 of MCU 792 for adjusting the potential of line 732.

Resistor R6 has its one end connected to receive the output of CIS 146 (VOUTS) and the other end connected to line 732. Resistor R5 is connected between line 732 and the ground.

When IR-CTL is at the High level, MCU 792 outputs a Low level signal at its output terminal 794 to which diode D1 is connected. Diode D1 is forward biased and become conductive. Current flows through resistor R4 and diode D1, causing the combined resistance of resistors R4 and R5 to be smaller $$\left(1 \Big/ \left(\frac{1}{R_4} + \frac{1}{R_5}\right)\right),$$

thereby lowering the potential of line 730. When IR-CTL is at the Low level, MCU 792 raises the potential at its output 794 connected to diode D1. Diode D1 will be reverse biased and will cease to be conductive. Current stops flowing through resistor R4 and diode D1, causing the complex resistance of resistors R4 and R5 to be larger (R5), thereby raising the potential of line 732 to its normal level.

Figure 35:
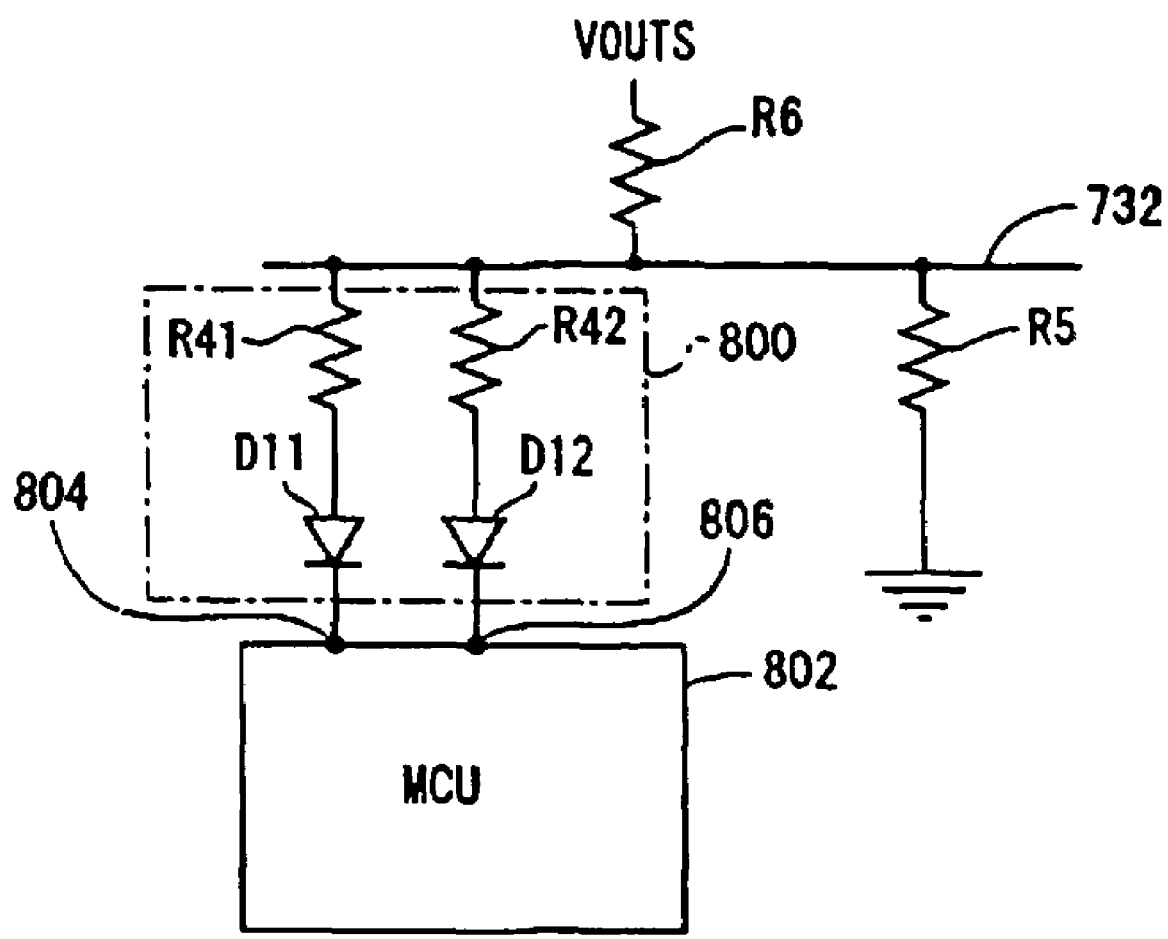
FIG. 35 shows another arrangement to handle the problem.

Another example of potential divider adjuster is shown in FIG. 35. In FIGS. 29, 34 and 35, like elements are denoted with like reference numerals. Referring to FIG. 35, potential divider adjuster 800 of this example include; resistors R41 and R42, and diodes D11 and D12. The anodes of diodes D11 and D12 are connected to one ends of resistors R41 and R42, respectively. The other ends of resistors R41 and R42 are connected to line 732. The cathodes of diodes D11 and D12 are connected to output terminals 804 and 806, respectively, of MCU 802 for controlling the combined resistance of resistors R41, R42, and R5. Note that resistors R41 and R42 are different from each other in this example.

In this arrangement, MCU 802 is capable of adjusting the potential of line 732 at any of four levels. When MCU 802 outputs High level signals at its output terminals 804 and 806, the combined resistance of resistors R41, R42 and R5 is the highest, causing the potential on line 732 to be the highest. When MCU 802 outputs a Low level signals at its terminals 804 and 806, the combined resistance of resistors R41, R42 and R5 will be at the lowest, thereby causing the potential of line 732 to be the lowest. When MCU 802 outputs a High level signal at one of its terminals 804 and 806, and outputs a Low level signal at the other, the potential of line 732 will be at one of two levels somewhere between the highest level and the lowest level depending on the resistance values of resistors R41, R42, and R5.

Thus, potential divider adjuster 800 is now field-programmable. Depending on the average level of the output VOUTS of CIS 146, potential divider adjuster 800 can select a diode or diodes to be conductive so that error should be advantageously eliminated.

Those skilled in the art will readily understand that any number of resistors and diodes may be used.

Although the present invention has been described using the embodiment directed to a computer golf game, it is not limited thereto. The present invention can be applied to any kind of position detector as long as the image of the object is rectangular. Further, there is no need to use reflective strip. As long as the object can reflect a light and forms a rectangular image on the image plane of the image sensor, a detector in accordance with the present invention can detect the position and the angle of the object.

The reflective object may be of any shape. Preferably, the reflective object may be of a symmetrical shape. The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A method of detecting an image of a reflective object, comprising the steps of:
    capturing a first image by an image sensor while a light-emitting device is emitting light;
    down-sampling a first image signal outputted from the image sensor to a first digital signal by comparing a level of the first image signal with a predetermined first reference level;
    capturing a second image by the image sensor while the light-emitting device is not emitting light;
    down-sampling a second image signal outputted from the image sensor to a second digital signal by comparing a level of the second image signal with a predetermined second reference level;
    computing an image of difference between the first image and the second image by subtracting the second digital signal from the first digital signal; and
    specifying the image of the reflective object by locating a bright point remaining in the image of difference, wherein
        the first reference level is the same as the second reference level and the step of down-sampling the first image signal includes the steps of:
            lowering the level of the first image signal by a predetermined amount; and
            down-sampling the first image signal having the level lowered by comparing the level of the first image signal having the level lowered with the second reference level.

2. A method as recited in claim 1, wherein
the light emitting device includes a light emitting diode that emits light of a non-visible wavelength and wherein
the step of capturing the first image includes a step of capturing the first image by the image sensor with a filter that substantially blocks visible light while the light emitting device is emitting light, and wherein
the step of capturing the second image includes a step of capturing the second image by the image sensor with the filter while the light-emitting device is not emitting light.

3. A method as recited in claim 2, further comprising:
emitting infrared light from the light emitting diode; and
selecting the filter to block light other than infrared light.

4. A method as recited in claim 1, wherein the step of computing includes the step of computing the image of difference between the first image and the second image by subtracting the second digital signal from the first digital signal on a pixel-to-pixel basis.

5. An apparatus for detecting an image of a reflective object, comprising:
    a light-emitting device;
    an image sensor;
    a control device configured to control the light emitting device and the image sensor such that the image sensor captures two successive images including a first image and a second image, the first image being captured while the light emitting device is emitting light, the second image being captured while the light emitting device is not emitting light;
    a down-sampling circuit connected to receive an output of the image sensor, for down-sampling image signals of the first image and the second image outputted from the image sensor;
    a difference image computing unit operable to compute a difference image by subtracting a down-sampled image signal of the second image from a down-sampled image signal of the first image;
    a unit operable to specify the image of the reflective object in a difference image by locating a bright point in the difference image; and
    a light control circuit that outputs a light control signal that assumes a predetermined first level or a predetermined second level, indicating a period when the light emitting device is allowed to emit light and a period when the light emitting device is prohibited from emitting light, respectively, wherein
        the down-sampling circuit includes a potential divider adjuster connected to receive the output of the image sensor, for lowering a level of the output of the image sensor by a predetermined amount while the light control signal is at the first level and for raising the level of the output of the image sensor by the predetermined amount while the light control signal is at the second level.

6. A device as recited in claim 5, wherein
the potential divider adjuster includes:
    a first resistor and a second resistor connected in series between an output terminal of the image sensor and a ground potential thereby forming a potential divider,
    a third resistor having one end connected to a connecting node of the first and second resistors, and
    a switching device connected between the other end of the third resistor and the ground potential for controlling the connection of the other end of the third resistor and the ground potential in response to the light control signal.

7. A device as recited in claim 6, wherein the switching device includes a transistor having an emitter and a collector connected to said other end of the third resistor and the ground potential, respectively and having a base connected to be controlled by the light control signal.

8. A device as recited in claim 6, wherein
the switching device includes:
    a first diode having an anode connected to said other end of the third resistor, and
    a unit connected to a cathode of the first diode operable to control the potential level of the cathode, thereby switching a conductive state of the first diode.

9. A device as recited in claim 8, further comprising a fourth resistor having one end connected to a connecting node, wherein
    the switching device further includes a second diode having the anode connected to an other end of the fourth resistor, and a unit connected to a cathode of the second diode operable to control the potential level of the cathode of the second diode, thereby switching a conductive state of the second diode.

10. A computer program product embodied on a tangible computer readable medium, the computer program product comprising instructions for:

capturing a first image by an image sensor while a light-emitting device is emitting light;

down-sampling a first image signal outputted from the image sensor to a first digital signal by comparing a level of the first image signal with a predetermined first reference level;

capturing a second image by the image sensor while the light-emitting device is not emitting light;

down-sampling a second image signal outputted from the image sensor to a second digital signal by comparing a level of the second image signal with a predetermined second reference level;

computing an image of difference between the first image and the second image by subtracting the second digital signal from the first digital signal; and specifying the image of the reflective object by locating a bright point remaining in the image of difference, wherein the first reference level is the same as the second reference level and the step of down-sampling the first image signal includes the steps of:

lowering the level of the first image signal by a predetermined amount; and down-sampling the first image signal having the level lowered by comparing the level of the first image signal having the level lowered with the second reference level.

* * * * *